(12) United States Patent
Moore

(10) Patent No.: US 9,196,066 B2
(45) Date of Patent: Nov. 24, 2015

(54) METHOD, APPARATUS AND SYSTEM FOR RENDERING AN OBJECT ON A PAGE

(75) Inventor: Kevin John Moore, North Ryde (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 13/479,624

(22) Filed: May 24, 2012

(65) Prior Publication Data

US 2012/0300256 A1 Nov. 29, 2012

(30) Foreign Application Priority Data

May 27, 2011 (AU) ................................ 2011202508

(51) Int. Cl.
- *G06K 15/02* (2006.01)
- *G06K 15/22* (2006.01)
- *G06T 11/20* (2006.01)
- *G06T 11/40* (2006.01)

(52) U.S. Cl.
CPC ...................................... *G06T 11/40* (2013.01)

(58) Field of Classification Search
CPC ........................................................ G06T 11/40
See application file for complete search history.

(56) References Cited

U.S. PATENT DOCUMENTS

| | | | |
|---|---|---|---|
| 5,517,603 A | 5/1996 | Kelley et al. | |
| 6,532,016 B1 | 3/2003 | Venkateswar et al. | |
| 6,597,363 B1 | 7/2003 | Duluk, Jr. et al. | |
| 7,023,437 B1 | 4/2006 | Voohies et al. | |
| 7,573,603 B2 * | 8/2009 | Pattusamy et al. | 358/1.3 |
| 2002/0158865 A1 * | 10/2002 | Dye et al. | 345/419 |
| 2005/0200867 A1 * | 9/2005 | Faggion | 358/1.9 |
| 2007/0296725 A1 | 12/2007 | Steiner et al. | |
| 2011/0134443 A1 * | 6/2011 | Ishikawa et al. | 358/1.2 |
| 2011/0299105 A1 | 12/2011 | Morrison et al. | |

FOREIGN PATENT DOCUMENTS

AU 2008260056 A1 7/2010

* cited by examiner

*Primary Examiner* — Chuong A Ngo
*Assistant Examiner* — Frantz Bataille
(74) *Attorney, Agent, or Firm* — Canon USA, Inc. IP Division

(57) ABSTRACT

A method of rendering a graphical object on a page in a pixel sequential renderer (1100) processing a page having a plurality of scanlines, is disclosed. Each of the scanlines is divided into at least a first swathe and a second swathe. The method tracks a plurality of edges of the graphical object and sorts a first portion of the tracked edges on a first swathe of one or the plurality of scanlines using a first sorter to control first activation information. A second portion of the tracked edges on a second swathe of said one of the plurality of scanlines is sorted using a second sorter to control second activation information and the second activation information is synchronized with the first activation information. The graphical object is rendered on the page in the pixel sequential renderer (1100) using the first and the synchronized second activation information.

16 Claims, 17 Drawing Sheets

METHOD, APPARATUS AND SYSTEM FOR RENDERING AN OBJECT ON A PAGE

REFERENCE TO RELATED PATENT APPLICATION

This application claims the benefit under 35 U.S.C. §119 of the filing date of Australian Patent Application No. 2011202508, filed May 27, 2011, hereby incorporated by reference in its entirety as if fully set forth herein.

FIELD OF INVENTION

The current invention relates generally to print rendering and, in particular, to a method and apparatus for rendering a graphical object on a page using parallel processors. The invention also relates to a computer program product including a computer readable medium having recorded thereon a computer program for rendering a graphical object on a page.

DESCRIPTION OF BACKGROUND ART

A conventional pixel sequential rasteriser 1000, for graphics rendering, is shown in FIG. 10. The rasteriser 1000 comprises an instruction execution module 1001, an edge tracking module 1002, a level activation module 1003, a pixel color generation module 1004, a compositing module 1005 and a pixel output module 1006. Each of the modules 1001-1006 are typically implemented as one of more computer software modules executing within a computer system. Each of the modules 1001-1006 may alternatively be implemented in dedicated hardware such as one or more integrated circuits.

In such a rasteriser 1000, the instruction execution module 1001 is used for configuration of the computer system to process a printing job. Edges of graphical objects (or "objects") are tracked between lines by the edge tracking module 1002, and object edge positions are passed to a level activation module 1003. The level activation module 1003 determines activation and visibility of graphical objects for runs of pixels between edges of the objects based on level activation information stored in level activation table. The output of the level activation module 1003 is a set of commands for drawing each run of pixels. The commands are provided with colour data by the pixel colour generation module 1004, and are performed by the compositing module 1005, the resulting pixel colours being output by the pixel output module 1006.

A need exists for a more efficient rasteriser for use in rendering a graphical object on a page.

SUMMARY OF THE INVENTION

It is an object of the present invention to substantially overcome, or at least ameliorate, one or more disadvantages of existing arrangements.

A method of rendering a graphical object on a page is disclosed. The graphical object, together with one or more other graphical objects, forms an image to be rendered on the page. The disclosed method allows for parallel processing of the activity state of the graphical objects that form the image to be displayed. In the disclosed method, edges of the graphical objects are tracked and directed into two or more streams of data, each of which is sorted by "X-axis position". Each stream of data separately controls the state of corresponding activation information in an associated level activation table that represents the states of graphical objects on the page. The information in the tables are switchable so that the activation state may be passed between the processes controlling each data stream when a synchronisation event occurs, such that the order of commands for graphics rendering by downstream modules is correctly maintained.

According to one aspect of the present disclosure, there is provided a method of rendering a graphical object on a page in a pixel sequential renderer processing a page having a plurality of scanlines, each of said scanlines being divided into at least a first swathe and a second swathe, said method comprising:

tracking a plurality of edges of said graphical object;

sorting a first portion of the tracked edges on a first swathe of one of the plurality of scanlines using a first sorter to control first activation information;

sorting a second portion of the tracked edges on a second swathe of said one of the plurality of scanlines using a second sorter to control second activation information;

synchronising the second activation information with the first activation information; and rendering the graphical object on the page in the pixel sequential renderer using the first and the synchronised second activation information.

According to another aspect of the present disclosure, there is provided a system for rendering a graphical object on a page in a pixel sequential renderer processing a page having a plurality of scanlines, each of said scanlines being divided into at least a first swathe and a second swathe, said system comprising:

a memory for storing data and a computer program;

a processor coupled to said memory for executing said computer program, said computer program comprising instructions for:

tracking a plurality of edges of said graphical object;

sorting a first portion of the tracked edges on a first swathe of one of the plurality of scanlines using a first sorter to control first activation information;

sorting a second portion of the tracked edges on a second swathe of said one of the plurality of scanlines using a second sorter to control second activation information;

synchronising the second activation information with the first activation information; and rendering the graphical object on the page in the pixel sequential renderer using the first and the synchronised second activation information.

According to still another aspect of the present disclosure, there is provided an apparatus for rendering a graphical object on a page in a pixel sequential renderer processing a page having a plurality of scanlines, each of said scanlines being divided into at least a first swathe and a second swathe, said apparatus comprising:

means for tracking a plurality of edges of said object;

means for sorting a first portion of the tracked edges on a first swathe of one of the plurality of scanlines using a first sorter to control first activation information;

means for sorting a second portion of the tracked edges on a second swathe of said one of the plurality of scanlines using a second sorter to control second activation information;

means for synchronising the second activation information with the first activation information; and means for rendering the graphical object on the page in the pixel sequential renderer using the first and the synchronised second activation information.

According to still another aspect of the present disclosure a computer readable medium having recorded thereon a computer program for rendering a graphical object on a page in a pixel sequential renderer processing a page having a plurality of scanlines, each of said scanlines being divided into at least a first swathe and a second swathe, said computer program comprising:

code for tracking a plurality of edges of said object;
   code for sorting a first portion of the tracked edges on a first swathe of one of the plurality of scanlines using a first sorter to control first activation information;
   code for sorting a second portion of the tracked edges on a second swathe of said one of the plurality of scanlines using a second sorter to control second activation information;
   code for synchronising the second activation information with the first activation information; and
   code for rendering the graphical object on the page in the pixel sequential renderer using the first and the synchronised second activation information.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

The performance of a rasteriser, such as the rasteriser (or "renderer") 1000, may be improved by performing operations in parallel where possible. The commands generated by the level activation module 1003 for each run of pixels are unique to each run, and may be executed independently. Parallelisation of the downstream modules 1004, 1005 and 1006 may therefore be implemented. However, the determination of the set of commands for drawing depends on knowing the state of objects on the page. And in a pixel sequential rasteriser (or "pixel sequential renderer"), such as the rasteriser 1000, the state of objects is modified when each object edge position is received from the edge tracking module 1002. Thus, the state of the objects on the page at each position depends on the history of object activations and de-activation.

One method of dealing with the issue of knowing the state of graphical objects on the page is to create a map of the state of graphical objects over the rendered image. The map may be created prior to the rendering of colour and compositing operations, with opportunities for object-parallel processing of edges. However, such a method requires storage and maintenance of a large amount of data, and is more practical for display systems where there is an opportunity for the data to be re-used.

Figure 11:
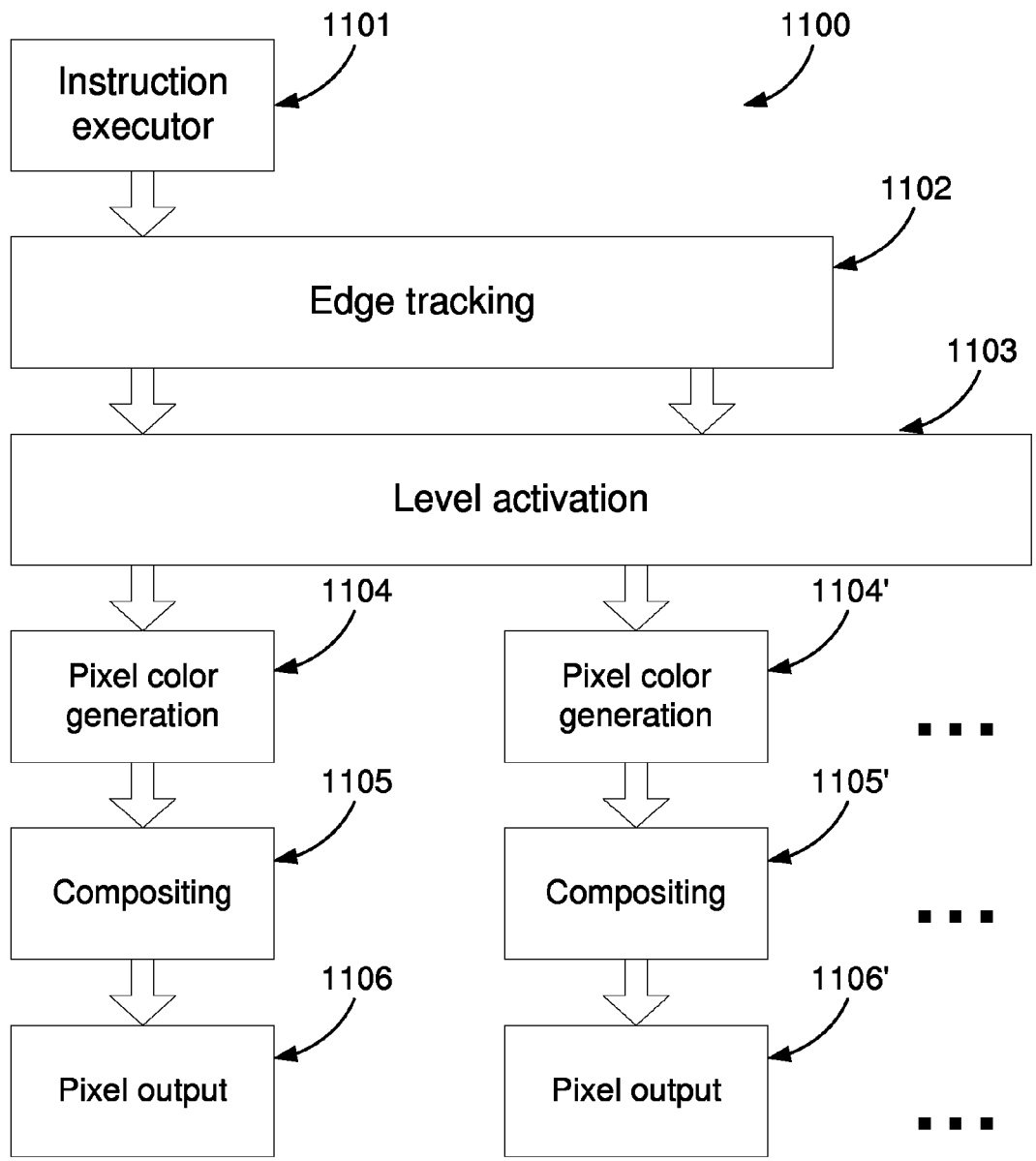
FIG. 11 shows a parallelised pixel sequential rasteriser for graphics rendering.

FIG. 11 shows a pixel rasteriser 1100. The rasteriser 1100 comprises an instruction execution module 1101, an edge tracking module 1102 and a level activation module 1103. The rasteriser 1100 also comprises a pixel colour generation module 1104, a compositing module 1105 and a pixel output module 1106. A plurality of further pixel colour generation modules 1104', compositing modules 1105' and pixel output modules 1106' are also configured in parallel to the modules 1104, 1105 and 1106.

Figure 14A:
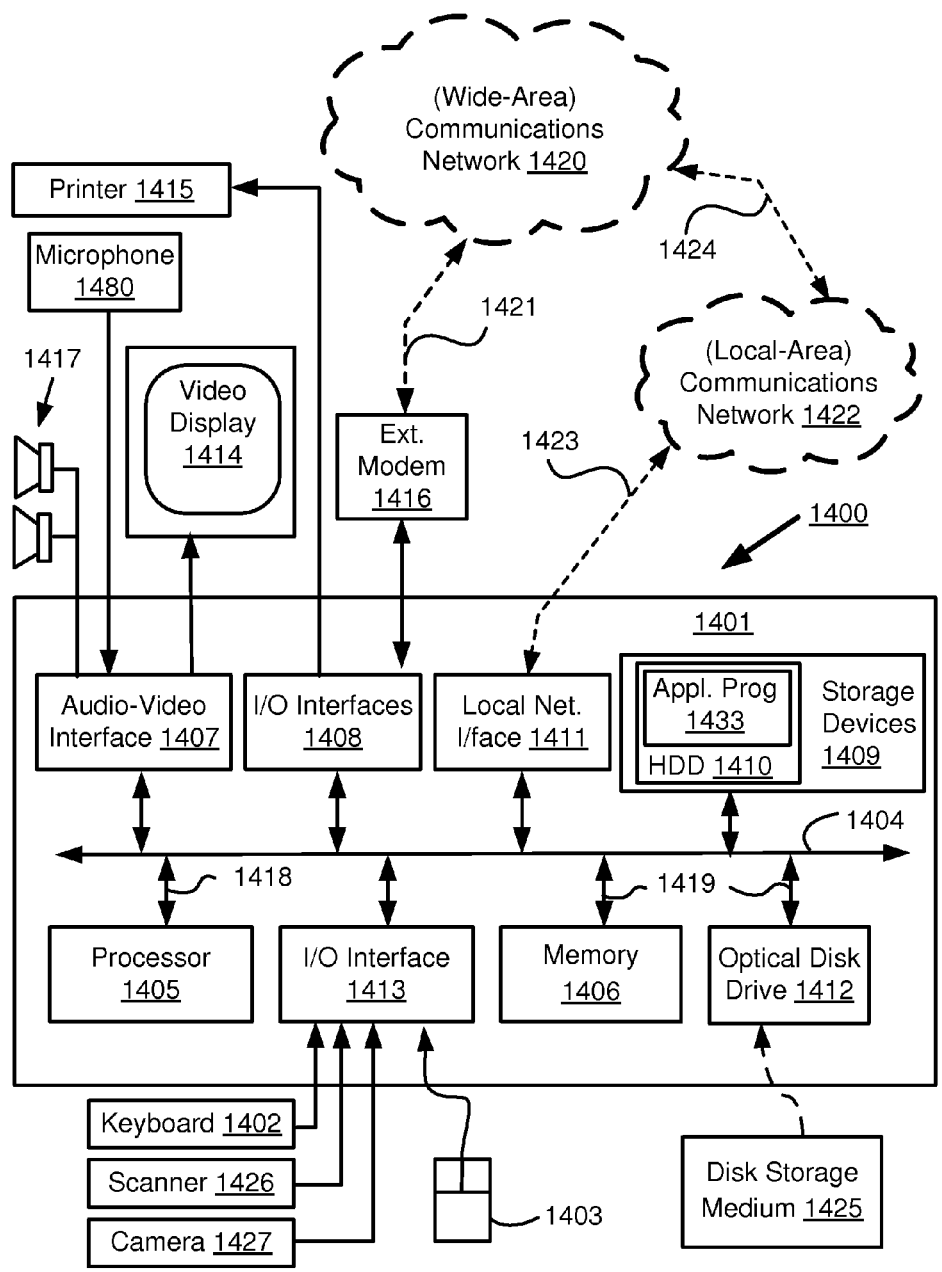
FIGS. 14A and 14B form a schematic block diagram of a general purpose computer system upon which arrangements described can be practiced.
Figure 14B:
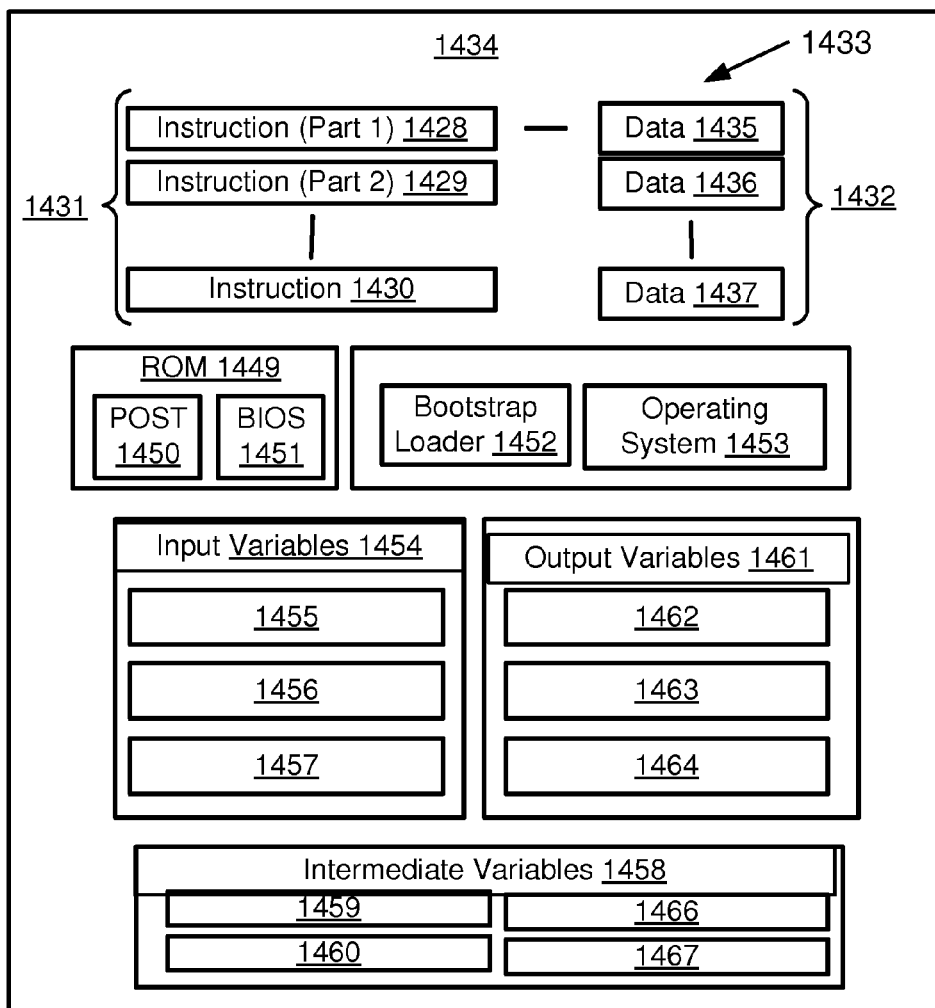
Figure 14B:
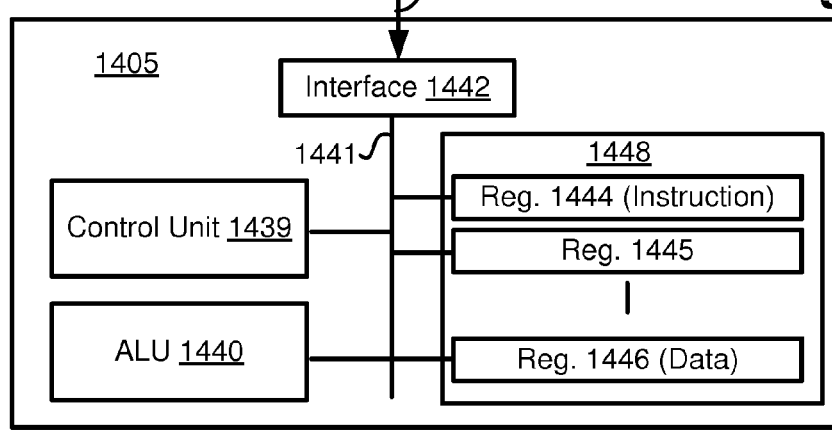

The rasteriser 1100 may be implemented on a general-purpose computer system 1400 as shown in FIGS. 14A and 14B.

As seen in FIG. 14A, the computer system 1400 includes: a computer module 1401; input devices such as a keyboard 1402, a mouse pointer device 1403, a scanner 1426, a camera 1427, and a microphone 1480; and output devices including a printer 1415, a display device 1414 and loudspeakers 1417. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420.

The computer module 1401 typically includes at least one processor unit 1405, and a memory unit 1406. For example, the memory unit 1406 may have semiconductor random access memory (RAM) and semiconductor read only memory (ROM). The computer module 1401 also includes a number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external modem 1416 and printer 1415. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 14A, the local communications network 1422 may also couple to the wide network 1420 via a connection 1424, which would typically include a so-called "firewall" device or device of similar functionality. The local network interface 1411 may comprise an Ethernet™ circuit card, a Bluetooth™ wireless arrangement or an IEEE 802.11 wireless arrangement; however, numerous other types of interfaces may be practiced for the interface 1411.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1400.

The components 1405 to 1413 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac™ or a like computer systems.

The rasteriser 1100 may be implemented, using the computer system 1400, as one or more software application programs 1433 executable within the computer system 1400. In particular, each of the modules 1101-1106 and 1104'-1106' may be implemented by instructions 1431 (see FIG. 14B) in the software application program 1433 that are carried out within the computer system 1400. The software instructions 1431 may be formed as one or more software code modules, each for performing one or more particular tasks. The software application program 1433 may also be divided into two separate parts, in which a first part and the corresponding code modules implements the rasteriser 1100 and a second part and the corresponding software code modules manage a user interface between the first part and the user.

The software application program 1433 may be stored in a computer readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for implementing the rasteriser 1100.

The software application program 1433 is typically stored in the HDD 1410 or the memory 1406. The software is loaded into the computer system 1400 from a computer readable medium, and executed by the computer system 1400. Thus, for example, the software application program 1433 may be stored on an optically readable disk storage medium (e.g., CD-ROM) 1425 that is read by the optical disk drive 1412.

In some instances, the software application program 1433 may be supplied to the user encoded on one or more CD-ROMs 1425 and read via the corresponding drive 1412, or alternatively may be read by the user from the networks 1420 or 1422. Still further, the software application program 1433 can also be loaded into the computer system 1400 from other computer readable media. Computer readable storage media refers to any non-transitory tangible storage medium that provides recorded instructions and/or data to the computer system 1400 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application program 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory modules (including the HDD 1409 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406 of FIG. 14A. A hardware device such as the ROM 1449 storing software is sometimes referred to as firmware. The POST program 1450 examines hardware within the computer module 1401 to ensure proper functioning and typically checks the processor 1405, the memory 1434 (1409, 1406), and a basic input-output systems software (BIOS) module 1451, also typically stored in the ROM 1449, for correct operation. Once the POST program 1450 has run successfully, the BIOS 1451 activates the hard disk drive 1410 of FIG. 14A. Activation of the hard disk drive 1410 causes a bootstrap loader program 1452 that is resident on the hard disk drive 1410 to execute via the processor 1405. This loads an operating system 1453 into the RAM memory 1406, upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory 1434 (1409, 1406) to ensure that each process or application running on the computer module 1401 has sufficient memory in which to execute without colliding with memory allocated to another process. Furthermore, the different types of memory available in the system 1400 of FIG. 14A must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

As shown in FIG. 14B, the processor 1405 includes a number of functional modules including a control unit 1439, an arithmetic logic unit (ALU) 1440, and a local or internal memory 1448, sometimes called a cache memory. The cache memory 1448 typically includes a number of storage registers 1444-1446 in a register section. One or more internal busses 1441 functionally interconnect these functional modules. The processor 1405 typically also has one or more interfaces 1442 for communicating with external devices via the system bus 1404, using a connection 1418. The memory 1434 is coupled to the bus 1404 using a connection 1419.

The software application program 1433 includes a sequence of instructions 1431 that may include conditional branch and loop instructions. The software application program 1433 may also include data 1432 which is used in execution of the software application program 1433. The instructions 1431 and the data 1432 are stored in memory locations 1428, 1429, 1430 and 1435, 1436, 1437, respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428 and 1429.

In general, the processor 1405 is given a set of instructions which are executed therein. The processor 1405 waits for a subsequent input, to which the processor 1405 reacts to by executing another set of instructions. Each input may be provided from one or more of a number of sources, including data generated by one or more of the input devices 1402, 1403, data received from an external source across one of the networks 1420, 1402, data retrieved from one of the storage devices 1406, 1409 or data retrieved from a storage medium 1425 inserted into the corresponding reader 1412, all depicted in FIG. 14A. The execution of a set of the instructions may in some cases result in output of data. Execution may also involve storing data or variables to the memory 1434.

The disclosed arrangements use input variables 1454, which are stored in the memory 1434 in corresponding memory locations 1455, 1456, 1457. The disclosed arrangements produce output variables 1461, which are stored in the memory 1434 in corresponding memory locations 1462, 1463, 1464. Intermediate variables 1458 may be stored in memory locations 1459, 1460, 1466 and 1467.

Referring to the processor 1405 of FIG. 14B, the registers 1444, 1445, 1446, the arithmetic logic unit (ALU) 1440, and the control unit 1439 work together to perform sequences of micro-operations needed to perform "fetch, decode, and execute" cycles for every instruction in the instruction set making up the program 1433. Each fetch, decode, and execute cycle comprises:

(a) a fetch operation, which fetches or reads an instruction 1431 from a memory location 1428, 1429, 1430;

(b) a decode operation in which the control unit 1439 determines which instruction has been fetched; and (c) an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each of the modules 1101-1106 and 1104'-1106' is associated with one or more segments of the program 1433 and is performed by the register section 1444, 1445, 1447, the ALU 1440, and the control unit 1439 in the processor 1405 working together to perform the fetch, decode, and execute cycles for every instruction in the instruction set for the noted segments of the program 1433.

The rasteriser 1100 may alternatively be implemented in dedicated hardware such as one or more integrated circuits performing the functions or sub functions of the modules 1101-1106 and 1104'-1106'. Such dedicated hardware may include graphic processors, digital signal processors, or one or more microprocessors and associated memories.

Figure 1:
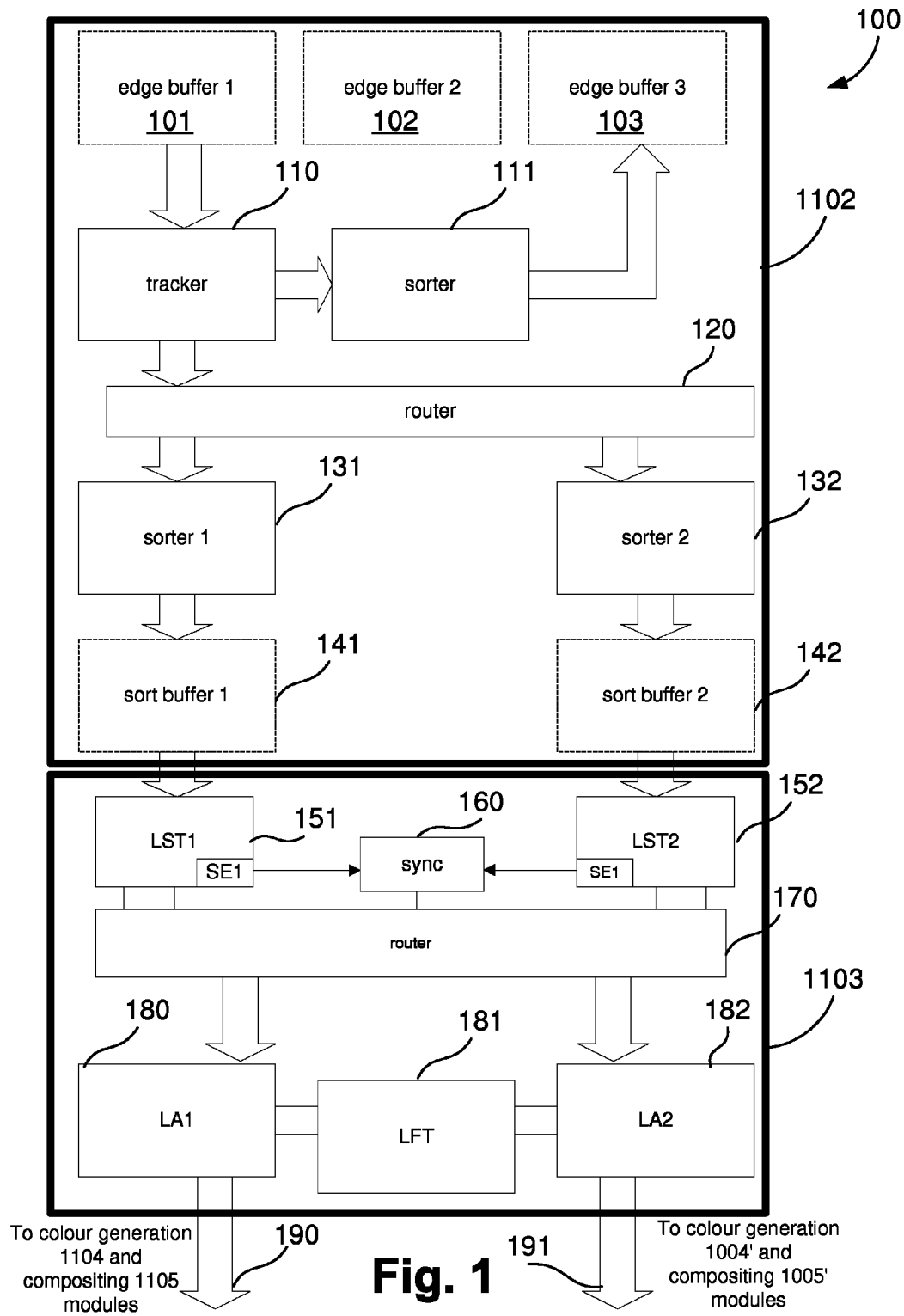
FIG. 1 is a schematic block diagram of an edge tracking module and a level activation module according to one example.
Figure 3A:
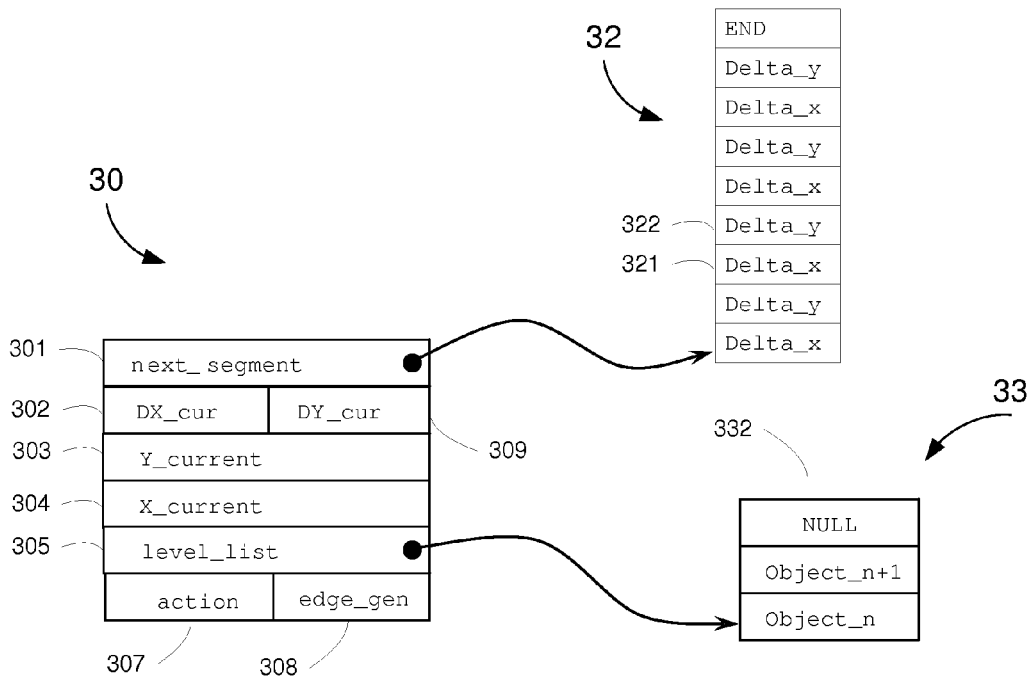
FIG. 3A is a schematic diagram showing an edge record associated with an edge of a graphical object.

FIG. 1 is a schematic block diagram showing the edge tracking module 1102 and the level activation module 1103 in more detail. Edge and position data structures used by the rasteriser 1100 are shown in FIGS. 3A to 3C.

As seen in FIG. 1, the edge tracking module 1102 comprises a tracker module ("Tracker") 110, which, under execution of the processor 1405, reads edge records from one of a set of edge buffers ("Edge buffer 1") 101, ("Edge buffer 2") 102, ("Edge buffer 3") 103 configured within the memory 1406. An example of an edge record 30, read by the tracker module 110 from the edge buffers 101-103, is shown in FIG. 3A. The edge record 30 contains information from which positions of object edges may be calculated on each scanline being rendered. The edge records (e.g., 30) are tracked for one or more scanlines.

Figure 3B:
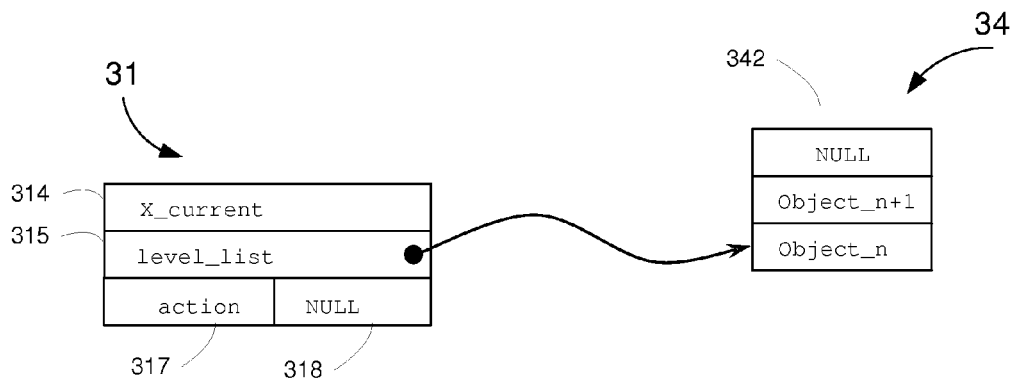
FIG. 3B and FIG. 3C are schematic diagrams showing a position record associated with an edge of a graphical object.
Figure 3C:
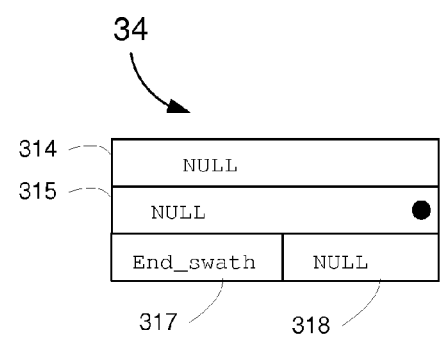

FIG. 3B shows a position record 31 containing position and object information for each edge on each scanline. The position record 31 is transmitted through router 120 into one of a number of sorter modules ("Sorter 1") 131, ("Sorter 2") 132, according to an X-position of the edge on that scanline. Each sorter module 131 and 132 maintains one or more buffers ("Sort Buffer 1") 141, ("Sort Buffer 2") 142 configured within the memory 1406. The number of buffers for each sorter module 131, 132 corresponds to the number of scanlines for which edges are tracked. In particular, a page to be printed is divided into swathes (or portions), and position records (e.g., 31) for each swathe are maintained by the sorter module (e.g., 131, 132) corresponding to the swathe.

Position records (e.g., 31) are read from the buffers 141 and 142 in order by a corresponding level state table controller module (LST1) 151, (LST2) 152 of the level activation module 1103 as shown in FIG. 1. The buffers 141 and 142 are configured within the memory 1406. The level state table controller modules 151, 152, under execution of the processor 1405, output a list of visible levels that is transmitted in compositing order to level activation modules (LA1) 180, (LA2) 182. The level activation modules 180, 182 share access to a level fill table (LFT) 181. The level fill table 181 stores graphics commands that, among other things, determine the colour that corresponds to each object. To ensure correct raster order, the router 170 that channels the level state information in the level state table 151, 152 is controlled by synchroniser ("Sync") 160. The synchroniser 160 ensures that level state information that determines the visibility of the objects on a page is correctly passed from one level state controller to the other. Synchronising of the level state information in the level state table 151, 152 will be described in further detail below with reference to FIG. 16. The level activation modules 180, 182 are responsible for generating commands that are transmitted down busses 190, 191 to the remaining modules 1104, 1104', 1105, 1105', 1106, 1106' which generate colours and perform compositing. The level activation modules 180, 182 determine activation and visibility of graphical objects for runs of pixels between edges based on level activation information stored in level activation tables. The level activation tables include level state tables 213, 214 and level fill table 222. Level state table 213, 214 determines the visibility of the object on a page while the level fill table has level fill information that determines the colour of the visible objects. For load balancing purposes, there may be a router on each bus 190 and 191 to distribute colour commands to multiple render pipelines.

Figure 4:
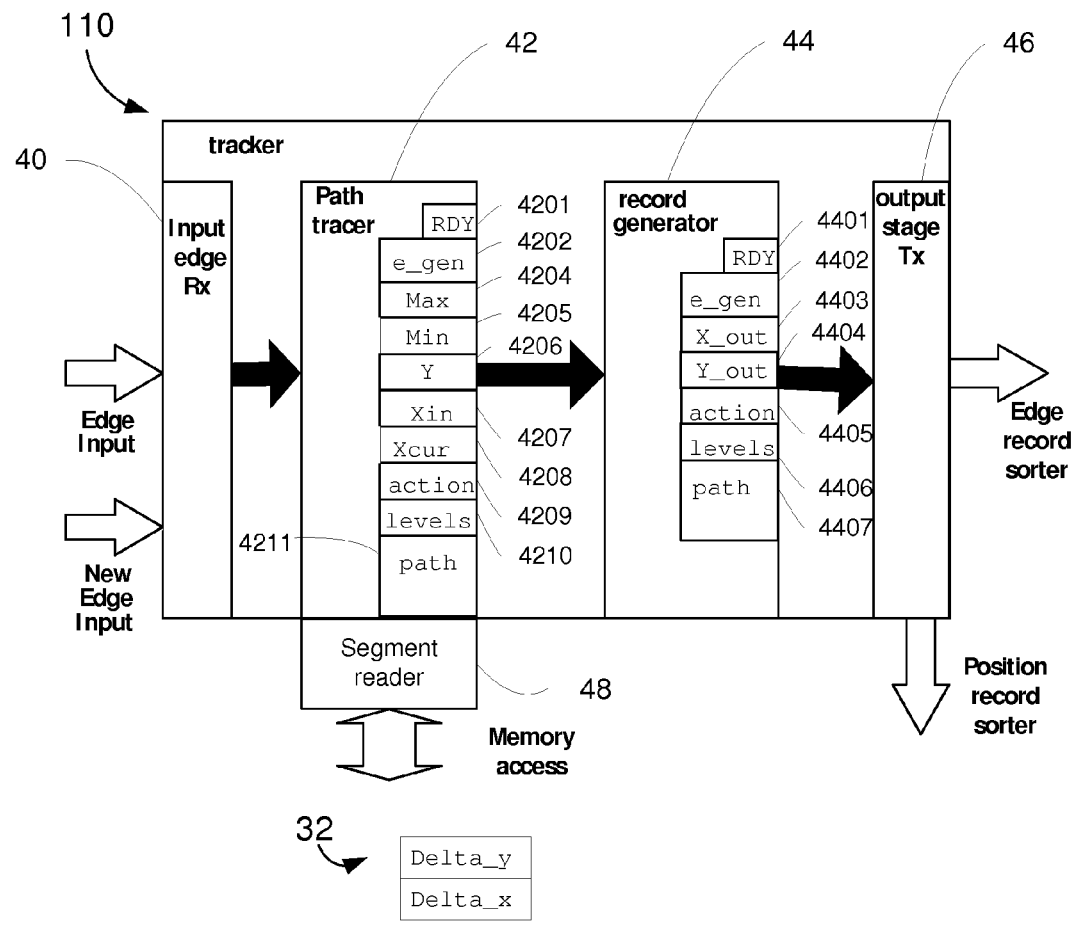
FIG. 4 is a schematic block diagram a tracker module shown in FIG. 1.

FIG. 4 shows the tracker module 110 in more detail. The tracker module 110, under execution of the processor 1405, uses and modifies the data structures shown in FIGS. 3A to 3C. FIG. 3A shows the configuration of outline segment data 32 and object level list data 33, stored by the edge record 30 within the memory 1406. FIG. 3B shows the configuration of object level list data 34 stored within the position record 31. The position record 31 is created by the tracker module 110 from fields in the edge record 30. The object level list data 34 may be accessed by the level activation module 1103 from memory (e.g., 1410) external to where the edge record (e.g., 30) is stored.

As seen in FIG. 3A, the edge record 30 contains the following fields for a corresponding edge:
edge_gen 308: encodes rounding rule for edges, as well as number and type of position records that should be generated. The edge_gen field 308 also indicates whether or not position records are generated on the final scan-line of the edge.
action 307: encodes the action to be performed on counters that control object activation.
level_list 305: is a field containing a pointer to a list of objects 342 that are modified by the edge.
X_current 304: is a field that contains the current X-position on the scanline.
Y_current 303: is a field containing the number of scanlines remaining in the current segment.
DX_cur 302: is a field containing the horizontal extent of the current segment.
DY_cur 309: is a field containing the vertical extent of the current segment.
next_segment 301: is a field containing the address within the edge data structure 32 that contains the horizontal and vertical extents of a next segment in the edge.

As seen in FIG. 3B, the position record 31 contains the following fields for a corresponding edge:
action 317: encodes the action to be performed on the counters that control object activation. The action to be performed on the counters is derived from the action field 307 in the edge record 30. For some types of edges, more than one action at separate positions may be derived from the edge.
level_list 315: is a field containing a pointer to a list of objects 342 that are modified by the edge.
X_current 314: is a field that contains the current X-position on the scanline.

Figure 8:
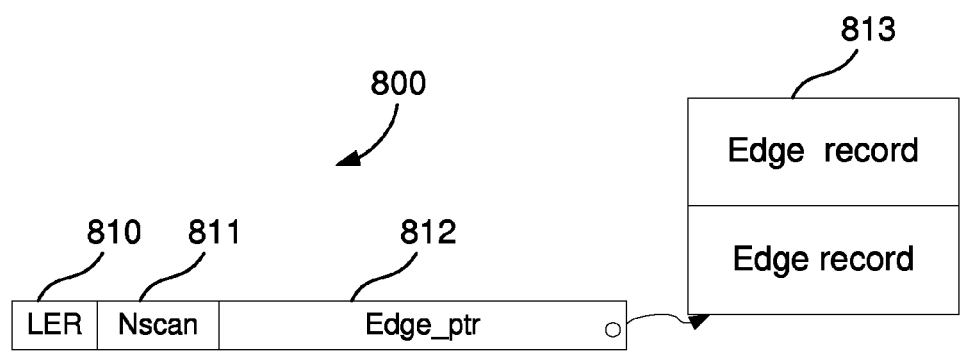
FIG. 8 shows the configuration of a load edges and render instruction.

Edges are loaded into the tracker module 110 by a load edges and render instruction 800 (see FIG. 8) received by the edge tracking module 1102 from the instruction executor module 1101. The configuration of the instruction 800 is shown in FIG. 8. As seen in FIG. 8, the load edges and render instruction 800 contains an instruction code field 810, a field 811 containing the number of scanlines to render, and a field 812 containing the address of a buffer configured within the memory 1406 and containing a list of edge records 813 to be read in at a current scanline.

Referring again to FIG. 4, on receipt of the load edges and render instruction 800, from the instruction executor module 1101, the tracker module 110 begins tracking edges. For a first scanline of tracking, edges are read by the module 110 from two sources: a list of new edges 813 within the instruction 800, and the edge buffer 101 configured within memory 1406. On subsequent scanlines, the edge buffer indicated by field 812 is not read. Processing continues for the number of scanlines specified in field 811 of the load edges and render instruction 800.

A next available edge is read from each of the list 813 and the edge buffer 101, by input edge receiver ("Input Edge Rx") 40 under execution of the processor 1405. The input edge receiver 40 compares the edges read from each of the list 813 and the edge buffer 101. The edge with a lowest X_current value in field 304 of the corresponding edge record 30 is processed. In particular, the edge with the lowest X_current value is passed by the input edge receiver 40 to path tracer module 42, which, under execution of the processor 1405, copies data values within the X_current field 304 of the input edge record 30 to XCur register 4208 and Xin register 4207 of the tracker module 110.

Path tracer module 42 also copies data values within Y_current field 303 to Y register 4206 and data values within edge_gen field 308 to e_gen register 4202. The path tracer module 42 also copies data values within the action field 307 of the edge record 30 to action register 4209 and data values within the level_list field 305 to levels register 4210. Data values within the DX_cur field 302, DY_cur field 309 and next_segment field 301 are copied to the path registers 4211.

The edge passed to the path tracer module 42 is now tracked for one or more scanlines using the stored data values and the path information stored in the registers 4206 to 4211. The maximum and minimum X extents are also tracked across each scanline, and stored in registers Max 4204 and MM 4205, respectively, configured within the memory 1406. For each scanline tracked, if Y is greater than one, then (DX_cur/DY_cur) is added to the X_current value stored in register 4208, and ready signal ("RDY") 4201 is asserted. The ready signal ("RDY") 4201 also indicates which scanline the X_current value in register 4208 corresponds to, so that the position value that is generated from the register values can be correctly routed.

If Y is less than one, then (Y*DX_cur/DY_cur) is added to the X_current value in field 4208, and segment data from the next_segment address in path register 4211 is fetched. The segment data is read in by segment reader 48, and stored in the DX_cur, DY_cur fields of the path register 4211, and the next_segment field 301 of the edge record 30 is incremented to point to the next segment values. If DY+Y<1, then the DX_cur and DY_cur values are added to the Xcur register 4208 and the Y register 4206, and the next segment is read in by the segment reader 48.

If a NULL record is encountered, indicating the end of the edge, the value in edge_gen field 308 of the edge record 30 is checked to determine whether position records are required on the final scanline: if so, the ready signal (RDY) 4201 is asserted with a code to indicate the final scanline. Otherwise, if DY+Y>=1, then ((1−Y)*DX_cur/DY_cur) is added to the Xcur register 4208, and DY_cur+Y−1 is stored in Y register 4206, and the RDY signal 4201 is asserted.

When record generator module 44 has copied the data that the module 44 needs, the module 44 de-asserts the RDY signal 4201. Edge processing is repeated for a fixed number of scanlines for each edge record (e.g., 30), and continues until all edges in the buffer, Edge Buffer 1 101, have been processed. Edge processing can then move onto the next buffer, Edge buffer 2 102.

The buffer arrangement shown in FIG. 1, comprising three chained buffers 101, 102, 103, is suitable where tracking is for two scanlines. However, edges may be inserted on any scanline. If edges are tracked for more than one scanline, then the edge records (e.g., 30) corresponding to the edges will be read in on alternating scanlines. In this instance, an output buffer, an input buffer, and one buffer for each of the intermediate scanlines may be required, because the starting point will determine which buffer the edge records are initially inserted into, and corresponding registers to hold the buffer addresses.

The value in the e_gen register 4202 determines the behaviour of the record generator 44. One or more position records (e.g., 31) may be generated for the values in the Xin register 4207, the Xcur register 4208, the Max register 4204 or the Min register 4205. Position records generated from the values stored in the Max register 4204 and the Min register 4205 are used to implement PostScript™ shape rasterisation. The record generator 44 also generates an edge record for the next scanline on the last scanline of the traversal.

As described above, the data structure of the position record 31 is shown in FIG. 3B. The position record 31 is created by the record generator 44, under execution of the processor 1405, by copying corresponding fields from the path tracer 42 The X_current value stored in the register 4208 is rounded according to a rounding rule, truncated or ceilinged. The e_gen value stored in the register 4202 specifies the rounding rule. The action indicated by register 4209 may also be modified, for example, to implement PostScript™ shape rasterisation. A counter is incremented in a level state table at floor(Min), and decremented at ceil(Max). The level state table will be described in more detail below.

The creation of the position record 31, rounding and incrementing operations are encoded into corresponding position records in place of the original action value stored in the register 4209. Again, the e_gen value stored in the e_gen register 4202 is used to encode the operations required.

The record generator ready signal (RDY) 4401 is asserted with a value stored in the register 4401 containing routing information copied from the path tracer ready signal (RDY) 4201. Each position record 31 is passed via router 120 to the sorter 131, 132 corresponding to the routing information.

In an alternative arrangement, the router 120 uses the X_current value stored in field 314 of the position record 31 to determine to which sorter 131 or 132 the position record 31 is to be passed.

When the edge has been tracked for the full number of scanlines, an edge record data structure 30 is created using the information current in the path tracer 42. The record generator e_gen register 4402, action register 4405, Y_out register 4404, levels register 4406 and path register 4407 latch data values from corresponding registers in the Path tracer 42. The record generator X_out register 4403 latches the value from the X_cur register 4208 in the Path tracer 42. The values stored in the registers 4402, 4403, 4404, 4405, 4406 and 4407 are used to create the output edge record 30 as follows:

path→DX_cur, DY_cur, next_segment
Y_out→Y_current
X_out→X_current
levels→level_list
action→action
e_gen→edge_gen A resulting data packet is passed to edge record sorter module 111, and sorted into output edge buffer (Edge buffer 3) 103.

Figure 7:
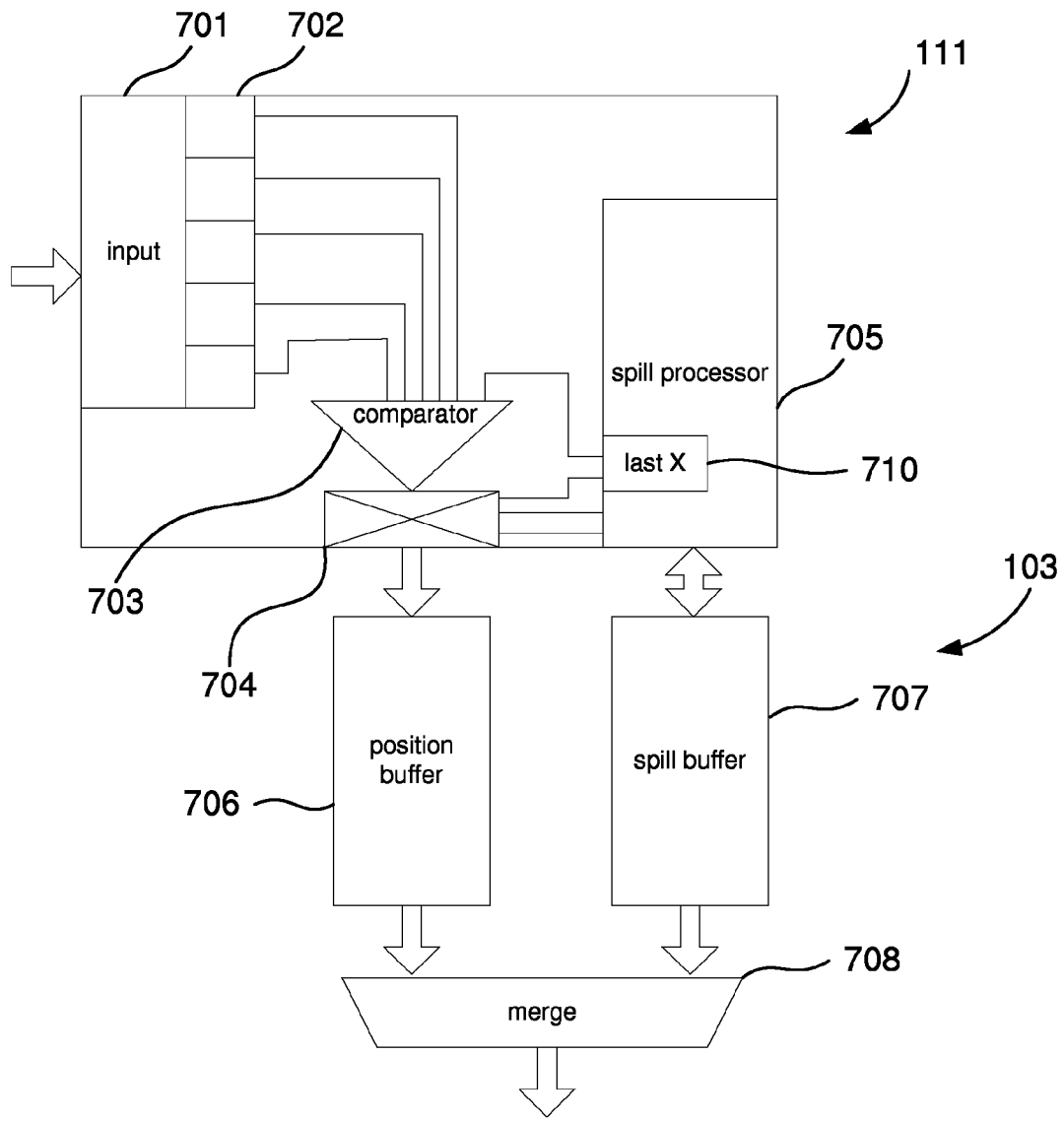
FIG. 7 is a schematic block diagram showing a sorter of the edge tracking module of FIG. 1.

The edge record sorter module 111 is shown in more detail in FIG. 7. The sorter modules 131 and 132 have a similar configuration. The position record 31 or edge record 30 is received by an input receiver 701, and latched into an available one of a set of registers 702. When all of the registers 702 are full, the X_current values stored in the fields 304, 314 of the records 30, 31 are compared by comparator 703, and the lowest X_current value is output by switch 704 to position buffer 706 and latched to Last X register 710. Outputting the lowest X_current value allows space for another position/edge record to be received and latched in the vacated registers 702. A subsequent position record 31 or edge record 30 is then received by the input receiver 701 and processed in a similar manner. However, for the subsequent position record 31 or edge record 30, if the lowest X_current value output by the switch 704 is less than the value latched in the Last_X register 710, then the subsequent record is passed by the switch 704 to spill processor 705. The spill processor 705 outputs the position record 31 or edge record 30 to a spill buffer 707 configured within the memory 1406. The processor 705 sorts the edge records in the spill buffer 707 using a suitable sorting algorithm, such as quicksort or heapsort.

When sorting is complete, the values stored within the position buffer 706 and the spill buffer 707 are merged into a single data stream by merge sorter 708.

In another implementation, the edge record sorter module 111 does not include the spill processor 705 for the edge records since sorting of position records (e.g., 31) by the sorter modules 131, 132 ensures that position data is passed to module 1103 in strict X-order. However, the comparison sorting performed by the module 111, using the comparator 703, is performed on edge records in any implementation of the module 111 to reduce the number of spill records as described above in the sorters 131 and 132.

Figure 5:
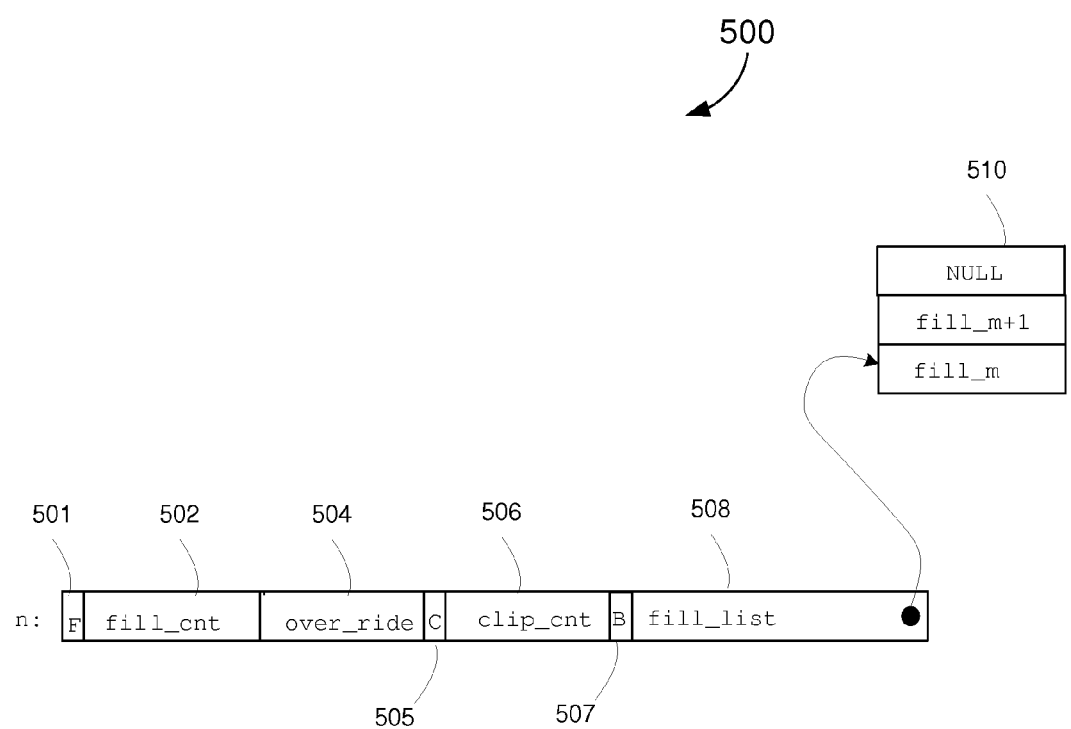
FIG. 5 shows a single entry in a level state table, together with an associated list of fills, according to one example.

The processing of the position records (e.g., 31) will now be discussed, with reference to FIG. 1, FIG. 5 and FIG. 6. The position records in the sort buffers 141, 142, configured within the memory 1406, are read in by level state table controller modules 151, 152 respectively. In one implementation, alternate scanlines of position records are provided to separate buffers. The alternate scanlines of the position records are processed such that output is provided in lowX or high X swathes to the subsequent modules (e.g., 1104, 1105, 1106, 1104', 1105' and 1106'), in correct raster order. To ensure correct raster order, the router 170 is controlled by synchroniser ("Sync") 160. The synchroniser 160 ensures that activity state is correctly passed from one level state controller to the other.

In another implementation, the position records (e.g., 31) are sorted by X-value into separate sort buffers for each swathe. In this instance, state information needs to be passed between operative modules (e.g., 1104, 1105, 1106, 1104', 1105' and 1106') at each swathe boundary. Level processing performed in such an implementation will be described in detail below with reference to FIG. 2.

The level state table consists of a set of counters and flags arranged in a table configured within the memory 1406. FIG. 5 shows the configuration of each entry 500 in the level state table, according to one example. Each entry (e.g., 500) in the level state table corresponds to a graphical object. The level of a particular entry (e.g., 500) in the level state table corresponds to the front to back priority of a corresponding graphical object. Parts of the level state table may be cached, and swapped out to the memory 1406 as required. In the example of FIG. 5, there are three counters, fill_cnt 502, override 504 and clip_cnt 506, and flags F 501, C 505, and B 507. Flag F 501 indicates a fill rule for graphical objects on the page to be rendered. The flag F 501 is asserted for non-zero winding objects, and de-asserted for odd-even winding objects. The C flag 505 indicates that the corresponding graphical object is a clipping object. The flag B 507 is a need_below flag. The flag B 507 is asserted to indicate that graphical objects below the level of the corresponding entry 500 are required in order to render the page.

Object activation will now be described with reference to FIGS. 5, 6 and 9. As described above with reference to FIG. 5, the level state table consists of a set of entries 500, consisting of a group of counters 502, 504, 506, and flags 501, 505 and 507, each entry 500 controlling the fills associated with a corresponding graphical object.

Figure 9:
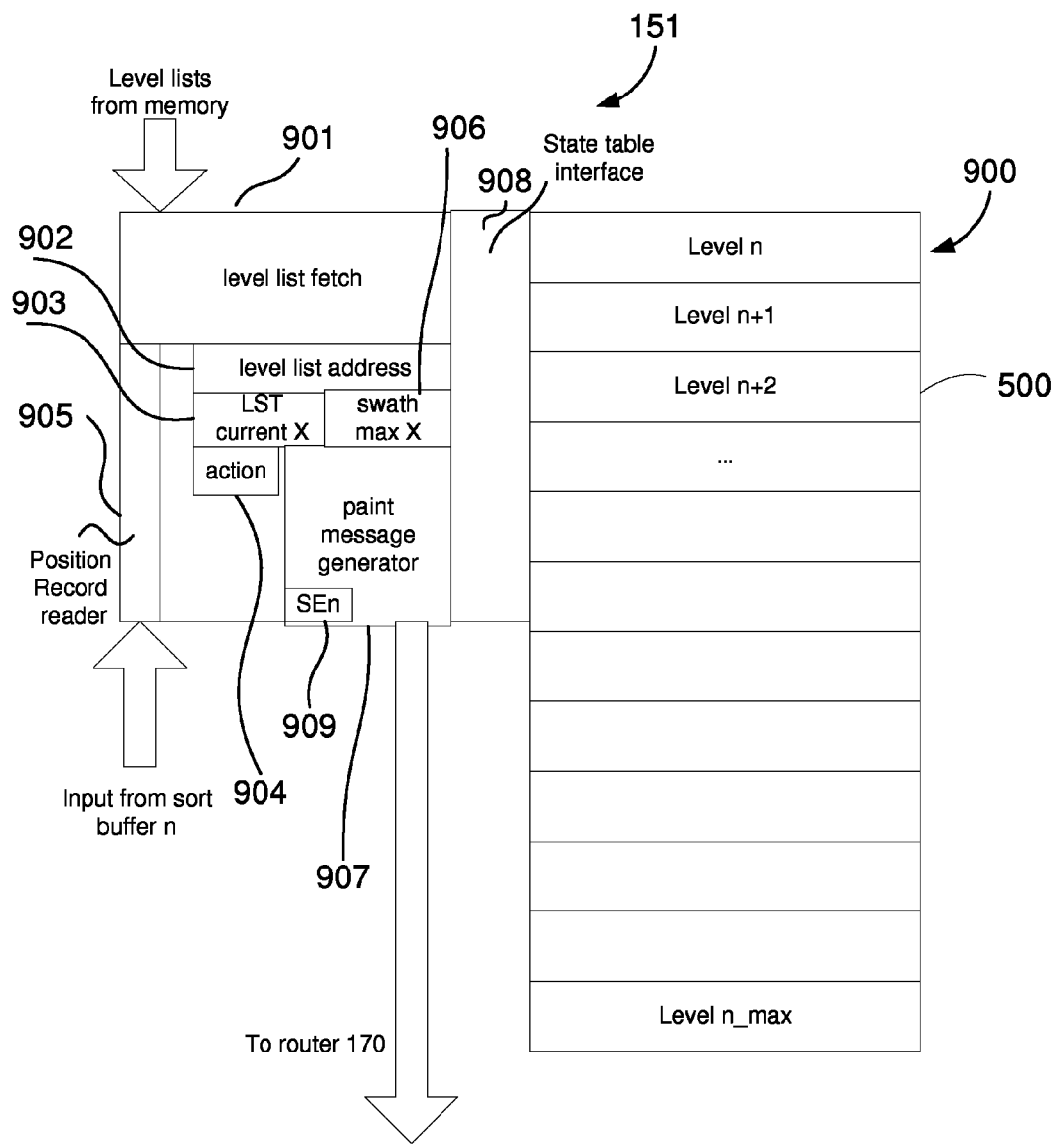
FIG. 9 is a schematic block diagram showing a level state table controller module of the level activation module of FIG. 1.
Figure 10:
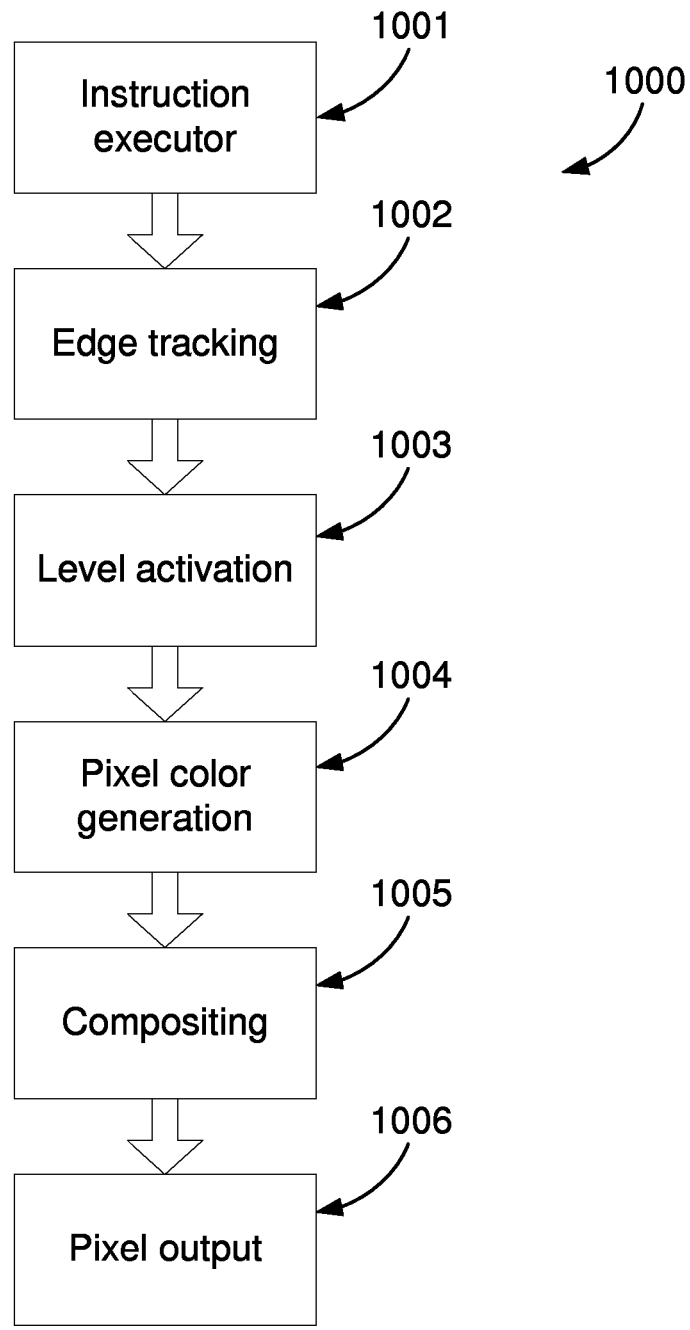
FIG. 10 shows a conventional pixel sequential rasteriser for use in graphics rendering.

FIG. 9 shows the level state table controller module 151 in more detail. The level state table controller module 152 has a similar configuration.

The level state table controller module 151 reads in position records (e.g., 31) from the sort buffer 141 configured within the memory 1406. The position records 31 are read in by a position record reader 905. The level state table controller module 151 performs the action specified in the action field 317 upon the counters 502, 504, 506 of a corresponding entry 500 specified in associated level list 342. The level state table controller module 151 also includes a register 903 holding current X position (i.e., LST_current_X).

As shown in FIG. 3B, the position record 31 comprises the value field 314 storing X position value (i.e., X_current) of the edge and a code field 317 (i.e., action) to indicate the action to be performed on the state table entries (or levels) affected. The position record 31 also comprises a level_list reference field 315 indicating a list of levels (or entries) 342.

The position record reader 905 reads a position record 31. An address of the level list 342 is read from the field 315 by the reader 905 and the address is latched and dereferenced. The level list 342 is fetched from memory 1406 by a level list fetch module 901 using the latched address.

The level state table controller module 151 checks the X_current value stored in field 314 of the position record 31 against the LST_current_X value stored in the register 903. The register 903 is maintained by the level state table controller 151. If the X_current value and the LST_current_X value are different, paint message generator 907 is signalled and the graphical objects that are visible are determined and read out of state table 900 configured within memory 1406. The visible graphical objects are passed via router 170 to current level activation module 180, 182. The current level activation module 180, 182 generates paint commands to render the graphical objects between the LST_current_X value and the X_current value.

If the X_current value is greater than a value stored in register 906 (i.e., Swath max X) then a fragment of the scanline to be printed is split into two sections. The first section is for the region of the scanline to be printed between LST current X and the value in the Swath max X register 906. The first section is sent to the router 170 immediately. An end swath command indicating the end of the current swath is also passed to the current level activation module 180, 182. A synchronisation event flag SE 909 is raised by the level state table controller module 151. The synchronisation event flag SE 909 indicates to the router 170 that the current swath is complete, and paint message generator 907 waits for the SE flag 909 to be cleared by the synchroniser 160, before sending paint commands to render objects between Swath max X and X_current on the page to be printed. The paint commands, and subsequent commands will be routed to the level activation module 180, 182 for the next swath. If there are more than two swaths, the swath width is added to Swath max X.

When the synchronisation flags SE 909 are raised on all LST modules, a signal is raised by the synchroniser 160 to the router 170, which triggers the re-routing of the paint commands to the next swathe in the scan sequence. When re-routing is complete, the router signals the synchroniser 160, and the synchroniser 160 clears the SE 909 on all LST modules, allowing processing of paint commands to proceed.

A level represented by an entry (e.g., 500) in the state table is considered active when:
 the value of the clip_cnt counter 506 is zero; and
 one of the following criteria is satisfied:
  (a) the value of counter 502, fill_cnt, is non-zero and the F flag 501 indicates non-zero winding fill rule;
  (b) the value of the counter 502, fill_cnt, is odd and the F flag 501 indicates odd-even fill rule; or
  (c) the value of the over_ride counter 504 is non-zero.

The B flag 507 of the entry 500 is used together with the counters 502, 504 and 506 above to determine which levels (or entries) are visible. If the B flag 507 (i.e., need below) on an active level is not asserted, then graphical objects below that active level are not visible, and commands are not generated for the not visible levels. Commands are generated by determining an uppermost active level (or entry 500) for which the need below B flag 507 is not asserted, and passing a command containing a command code and the value of the fill_list field 508 for all active graphical objects down to this, the lowest visible level.

Once all commands for rendering have been generated for the fragment, the LST_current_X value stored in the register 903 is updated to the new value, obtained from the X_current field 314 of the message, and the level state table controller module 151 performs the action specified in the code field 317 (i.e., action) to indicate the action to be performed on the counters 502, 504 in the levels (or entries 500) in the level list 342 specified by level_list reference field 315, fetched from memory 1406. The possible actions include the following:
 (i) increment fill_cnt
 (ii) decrement fill_cnt
 (iii) increment over_ride
 (iv) decrement over_ride A coding may be chosen that allows more than one action to be performed from a single message.

The clip counter 506 may be activated in place of the fill counter 502 for graphical objects that are controlled by a clip level (i.e., as indicated by the clip flag 505, C). If a clip level is encountered, then the clip count of subsequent level entries 500 is incremented if the clip level was activated by the level entry, and decremented if the clip level was de-activated by the level entry.

Figure 6A:
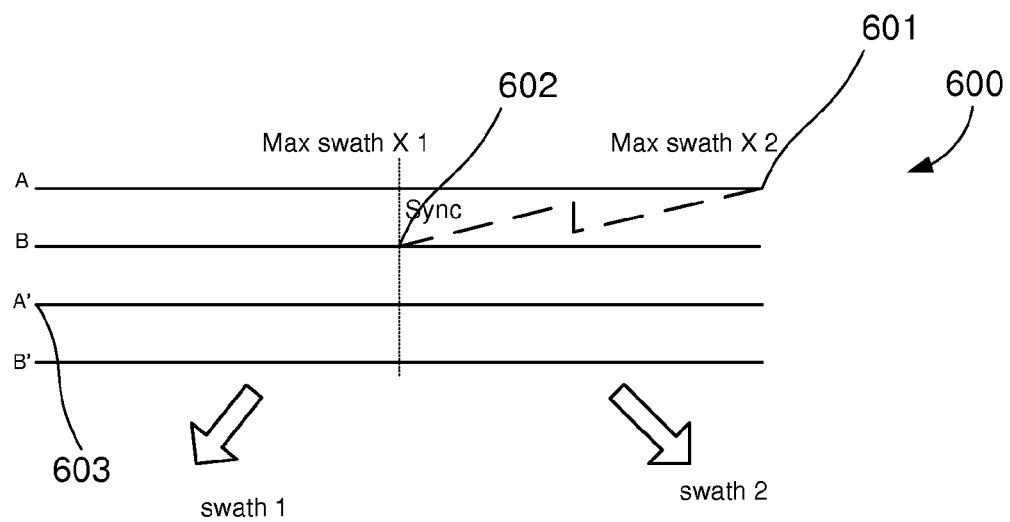
FIG. 6A shows four scanlines processed using the edge tracking module and level activation module of FIG. 1.

In order for rendering to proceed down a page in strict pixel sequential order for each swath, routing needs to be synchronised. A synchronisation method used in one implementation, will now be described with reference to FIG. 6A. In the example of FIG. 6A, two swaths (i.e., swath 1 and swath 2) are shown. However, the described synchronisation method may be used for any number of swaths.

Position record 31 processing proceeds such that alternate scanlines are handled by the two state table controller modules (LST1) 151, (LST2) 152 of the level activation module 1103. As seen in FIG. 6A, when processing of the second swath of scanline A by the second state table controller module (LST2) 152 reaches the end 601 of the scanline A, the processor 1405 waits for processing of first swath of scanline B by the first state table controller module (LST1) 151 to proceed to the end 602 of swath 1 (i.e., as shown by the phantom line at Max Swath X 1). Processing of the first state table controller module 151 then moves to scanline A' as shown by reference numeral 603 while the second state table controller module 152 takes over the processing of scanline B in the second swath. Paint commands for rendering scanline A for swath 1 is then sent to the level activation modules 180 or 181.

Similarly, processing of scanline B by the second state table controller module 152 waits until all paint commands for scanline A have been sent to the level activation modules 180 or 181 before proceeding beyond point 602. That is, the paint commands for scanline B in the second swath is sent to the level activation modules 180 or 181 through the router 170 after the paint commands for scanline A in the second swath have been sent. A routing switch is made by the synchroniser 160 after the SE flags 909 have been asserted for both level state table controller modules 151, 152. The routing switch is made, then the synchroniser 160 de-asserts the SE flags 909 in both level state table controller modules 151, 152. Thus, paint commands generated for scanline B in swath 2 beyond point 602 by the second state table controller module 152 are directed to the level activation modules 180 or 182 after the paint commands for the second swath of scanline A prior to point 601 generated by the second state table controller module.

In a subsequent step, the paint commands for scanline A' for swath 1 generated by the first state table controller module 151 are passed to the level activation modules 180 or 181 after all of the paint commands for scanline B in the first swath prior to the point 602 generated by the first state table controller module 151.

The level activation modules 180, 182 share access to the level fill table 181. The level fill table is indexed by the fill values in the fill list 510 addressed by the fill_list field (e.g., 508) in the state tables configured within the memory 1406. The fill_list fields 508 are copied into the paint commands by the paint message generator 907. The level fill table 181 contains the commands for calculating the pixel colour values. Because the contribution of each object may require multiple commands, there may be multiple values in the fill list 510 for any particular state table entry 500.

On receipt of a paint command, a level activation module 180, 182 dereferences the fill list field 508, and activates the fills in the fill list 510 by setting a corresponding flag in the level activation module 180, 182. When all of the paint commands for a fragment of the page to be printed have been received, and the fills activated, the level activation module 180, 182 copies the commands for calculating the pixel values for each active fill, and passes the commands, in order, down the buses 190 and 191 to the colour generation and compositing modules (e.g., 1104, 1105, 1106, 1104', 1105' and 1106') responsible for generating pixel colours.

Figure 2:
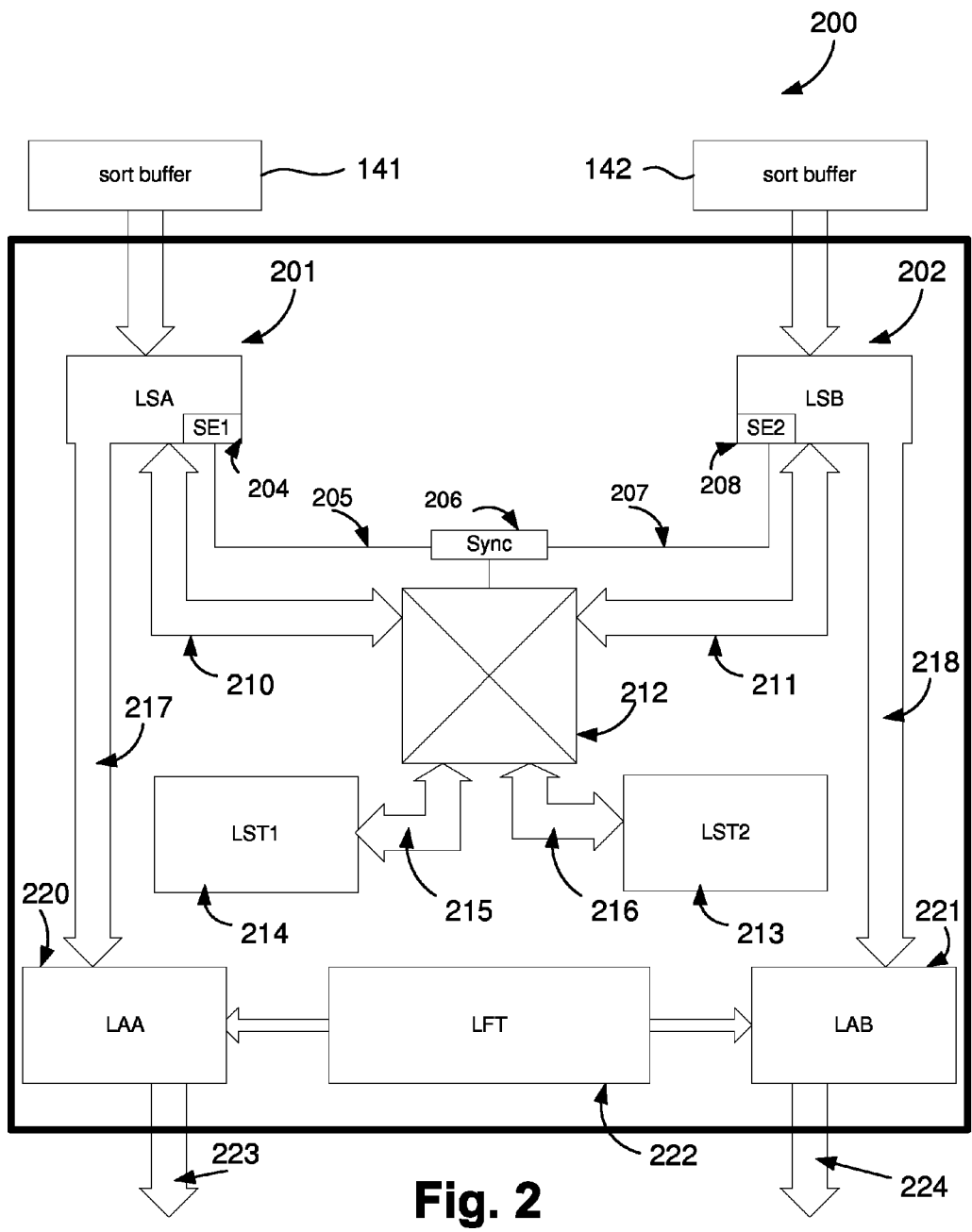
FIG. 2 is a schematic block diagram of a further level activation module for use with the edge tracking module of FIG. 1.

In a further implementation, edge tracking may be split into swathes (or portions). In this case, edges are sorted into swaths according to X values associated with the edges and the sort buffers 141, 142 are dedicated to a particular swath. In the further implementation, state table controller modules are also dedicated to a particular swath. If edges are tracked for multiple scanlines, separate sort buffers (e.g., 141, 142) are used for each alternate tracking pass, as edges for the same scanline are merged. Such a further implementation will now be described with reference to FIG. 2 and FIG. 12. FIG. 2 shows a further level activation module 200 for use with the edge tracking module 1102 of FIG. 1, according to the further implementation. The edge tracking module 1102 and level activation module 1103 (200 in FIG. 2) may form part of the rasteriser 1100 which may be implemented on the general-purpose computer system 1400 as described above.

The level activation module 1103 (200 in FIG. 2) comprises level state table controller modules ("LSA") 201 and ("LSB") 202 which access level state tables ("LST1") 214, ("LST2") 213 stored within the memory 1406 through a synchronised switch 212. The synchronised switch 212 allows bus 210 to be connected to one of the buses 215, 216, while bus 211 is connected to the other bus 216, 215. The switch 212 allows the level state tables ("LST1") 214, ("LST2") 213 to be swapped without dumping the level state tables 214, 213 to memory 1406 and reading the level state tables 214, 213 back, which is a comparatively slow process. The switch 212 is synchronised at a swath boundary to ensure that switching occurs when both level state tables ("LST1") 214, ("LST2") 213 are in a ready state.

Figure 12:
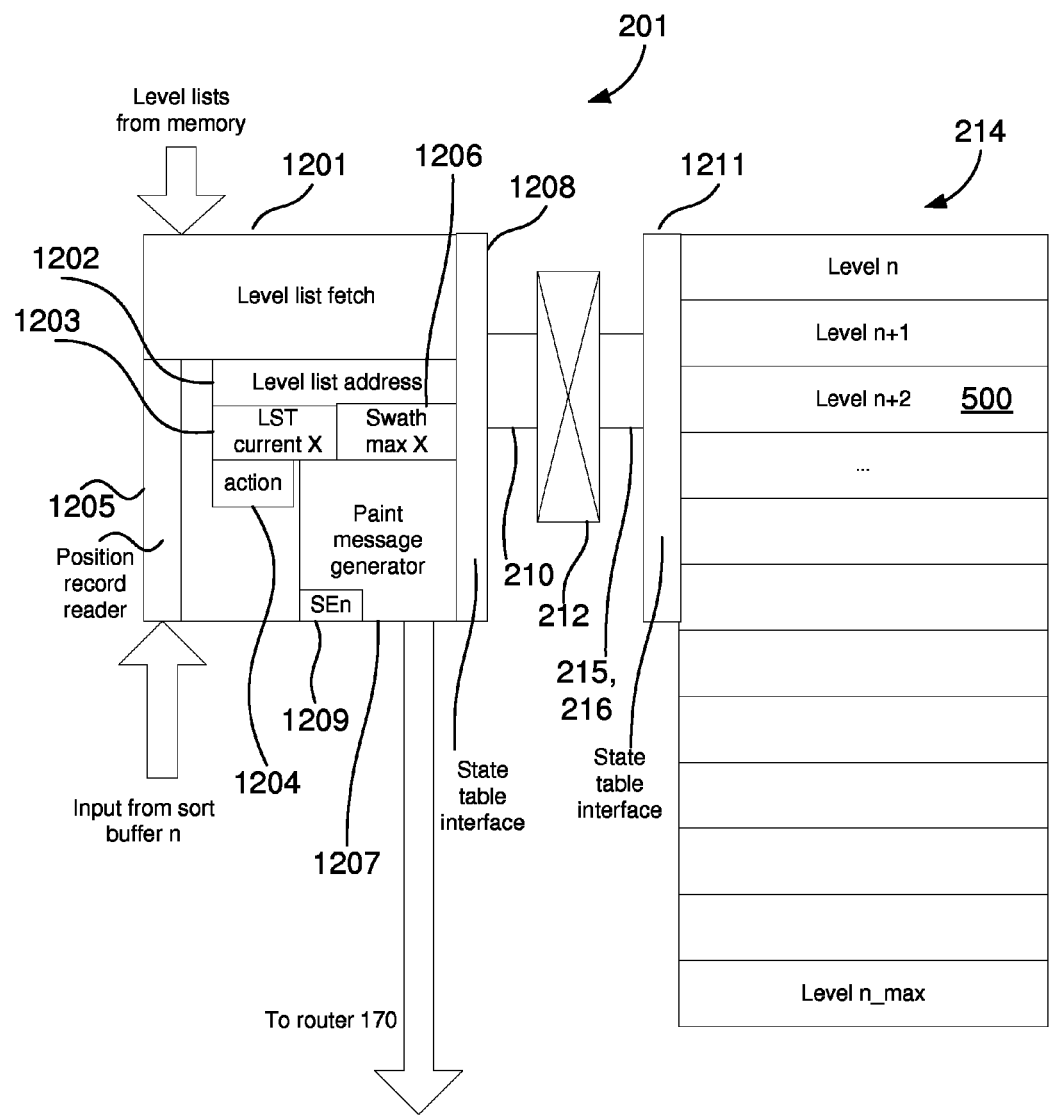
FIG. 12 is a schematic block diagram showing a level state table controller of the level activation module of FIG. 1.
Figure 13:
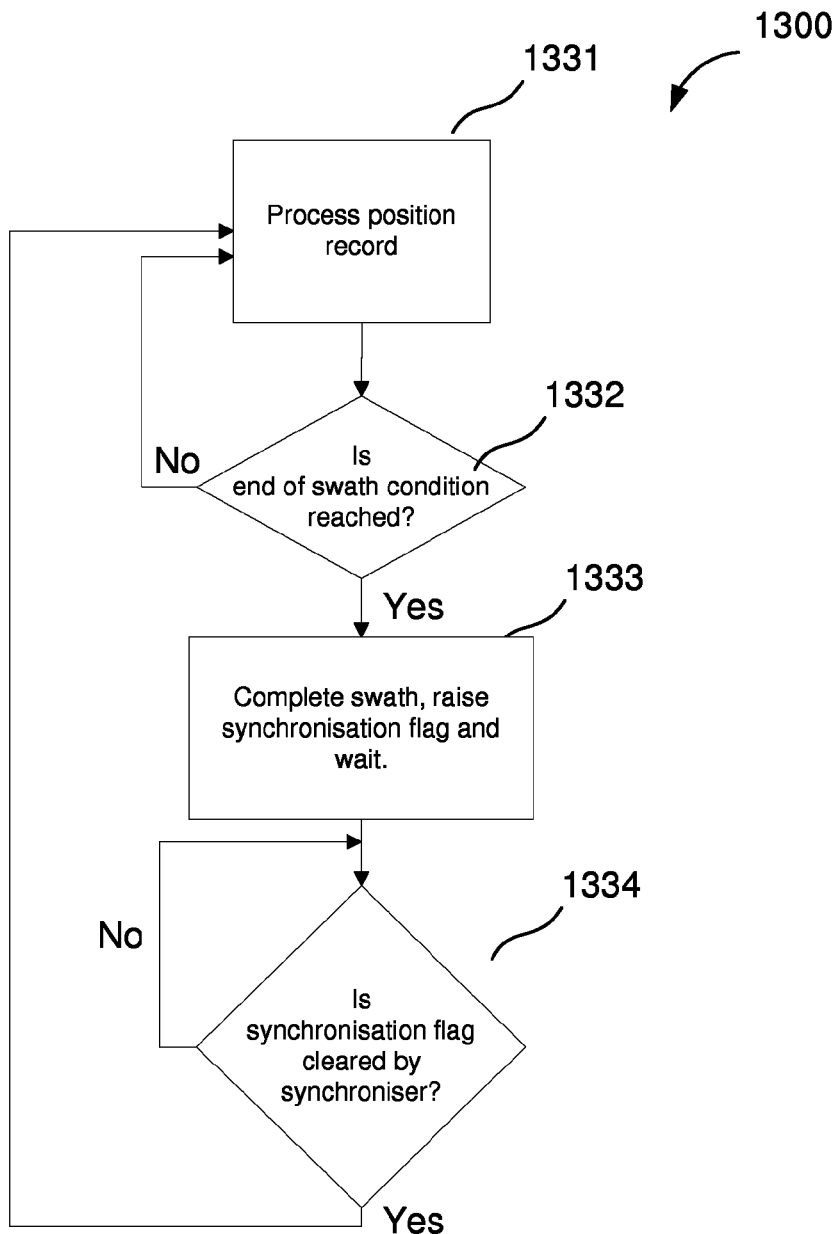
FIG. 13 is a flow diagram showing a method of controlling level state tables.

A method 1300 of controlling the level state tables ("LST1") 214, ("LST2") 213 will now be described with reference to FIGS. 12 and 13. The method 1300 may be implemented as one or more software code modules of the application program 1433 resident on the hard disk drive 1410 and being controlled in their execution by the processor 1405. The method 1300 will be described by way of example with reference to FIG. 12 which shows the level state controller module ("LSA") 201.

The method 1300 begins at input step 1331, where the level state table controller module ("LSA") 201, under execution of the processor 1405, reads and processes a position record 31. As seen in FIG. 12, a position record reader 1205 of the module 201 reads the position record 31 in from the sort buffer 141. A level list address stored in field 315 of the position record 31 is latched and dereferenced by the level state table controller module ("LSA") 201. A level list 342 is fetched from memory 1406 by a level list fetch module 1201. The level state table controller module 201 checks an X_current value stored in field 314 of the position record 31 against a LST_current_X value 1203 maintained by the level state table controller module 201.

If the X_current value and the LST_current_X value are different, paint message generator 1207 is signalled and graphical objects that are visible are determined and read out of the level state table (e.g., 214) configured within memory 1406. The visible graphical objects are passed to the level activation module 220. The level activation module 220 generates paint commands to render the graphical objects between the LST_current_X value and the X_current value. The visible graphical objects are determined by signalling through the state table interfaces 1208, 1211, connected by buses 210, 215/216, through switch 212. State table interface 1211 returns level (or entry 500) numbers of active levels (or entries) of the state table 214 between an uppermost active level and a highest active level having a corresponding need below flag ('B") 507 cleared.

The level state table 214 is maintained through buses through the state table interfaces 1208, 1201, connected by buses 210, 215/216, through switch 212. For each entry 500 in the level state table 214, an action and level number is placed on the bus in sequence by state table interface 1208, and received by state table interface 1211, which performs the action on the level specified, as described above for the level state table controller module 151.

At decision step 1332, if the module 201, under execution of the processor 1405, determines that the end of a current swath has been reached, then the method 1300 proceeds to swath completion step 1333. Otherwise, the method 1300 returns to step 1331. An end of swath condition is recognised at step 1332 when an end_swath record (FIG. 3C, 317) is detected in the object level list data 34 of the position record 31 read in at step 1301, as shown is FIG. 3C. When an end swath record is encountered, paint commands are generated for the fragment of the page remaining, from LST_current_X to the value stored in register Swath max X 1206.

At step 1333, a synchronisation event flag ("SE") 1209 is raised by the module 201 under execution of the processor 1405. The synchronisation event flag ("SE") 1209 indicates to synchroniser 206, as seen in FIG. 2, that the current swath is complete. The paint message generator 1207 waits for the SE flag 1209 to be cleared by the synchroniser 206.

At decision step 1334, if the module 206, under execution of the processor 1405, determines that a synchronisation condition has been reached, the module 206 signals the crossbar switch 212 to re-route access to the level state tables 214 and 213. The module 206 then clears the synchronisation flags SE1 (204) and SE2 (208) before the method 1300 returns to step 1331, where the other state table is accessed. Otherwise, the method 1300 continues to wait.

The synchroniser used at step 1334 is described with reference to FIG. 6B and FIG. 16. Synchronisation is necessary since the state of the level state tables (e.g., 214, 213) at the start of each swath is dependent on the state of the objects prior to the start of the swathe, and is required to be correctly determined before processing can proceed.

Figure 6B:
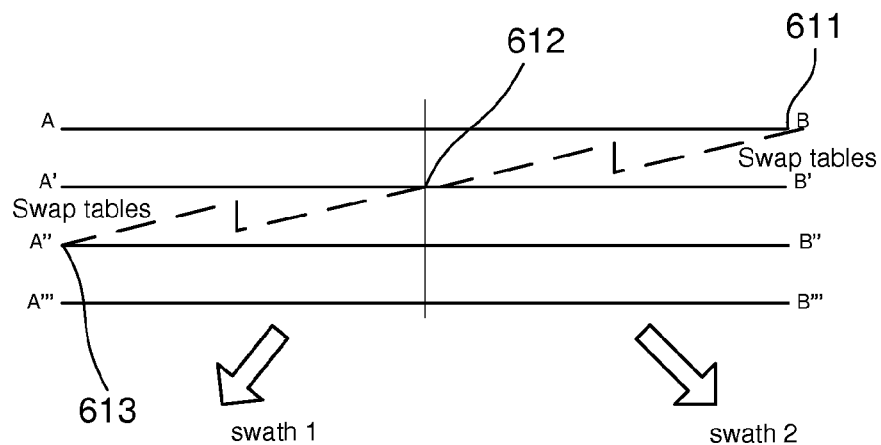
FIG. 6B shows four scanlines processed using the level activation module of FIG. 2.

The state of the level state tables (e.g., 214, 213) at start position 612 for swath 2, as seen in FIG. 6B, depend on the state of graphical objects that were processed for swath 1. In a typical print job, many graphical objects may be activated, even though only a few are actually visible. The state of the graphical objects needs to be correctly maintained, as the graphical objects may become visible at a later position on the page. Similarly, processing for swath 1 cannot proceed until the level state table (e.g., 213) being used by swath 2 for the previous scanline becomes available (i.e., when processing reaches point 611). The synchronisation event occurs when processing has reached point 611 on scanline AB, and point 612 on scanline A'B'. When such a condition is satisfied, the state tables 214 and 213 are in the correct state for a level state table swap to safely occur.

Figure 16:
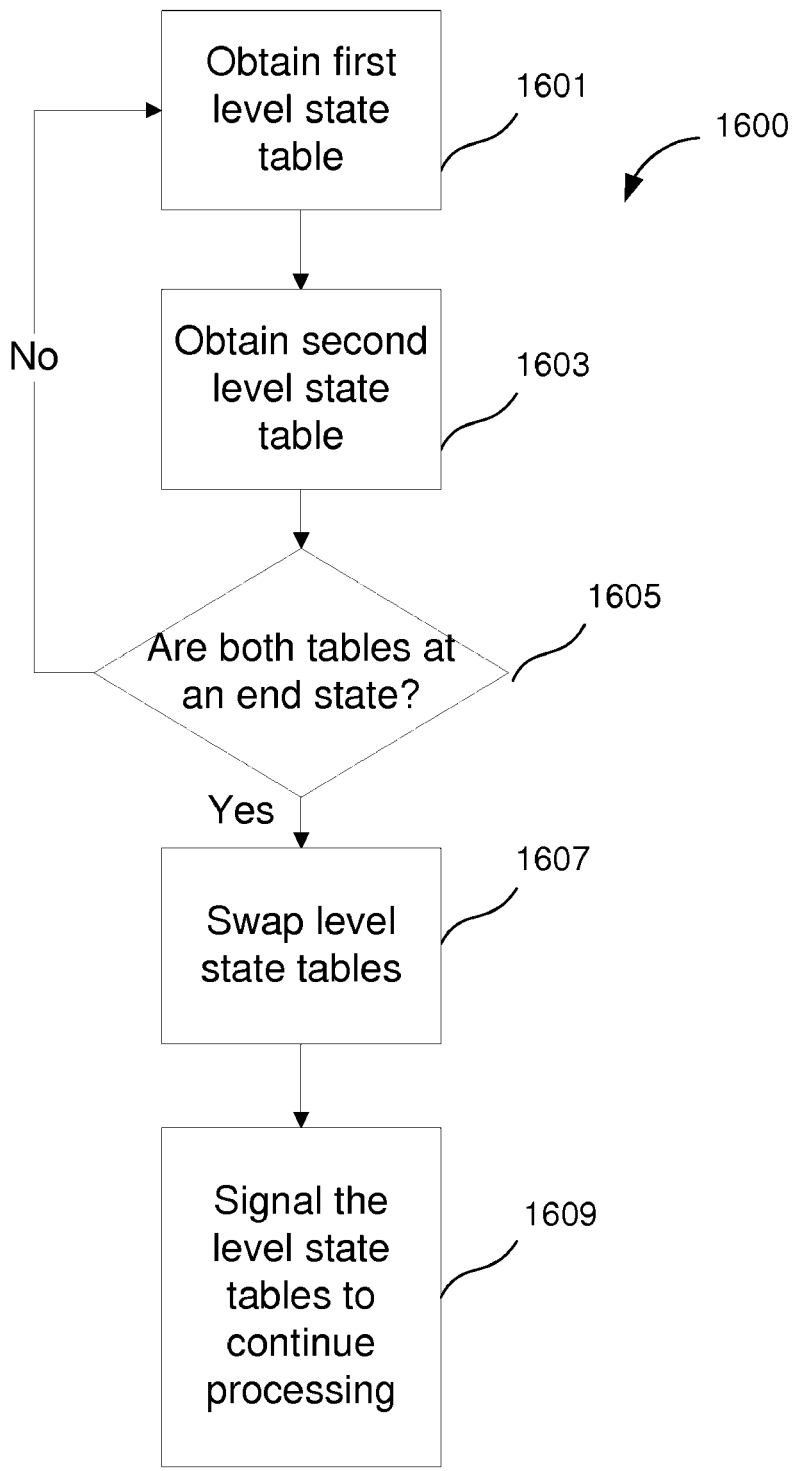
FIG. 16 is a flow diagram showing a method of synchronising level activation information.

The synchroniser 206 performs the steps shown in FIG. 16. At step 1601, the synchroniser 206 reads a signal SE (204) from a level state table 201 that indicates that processing is complete and the state table is ready for swapping. At step 1603 the same is done for the signal 208 on the second table 202. If the determination step 1605 determines that the tables are ready to swap, the method 1600 moves to step 1607, otherwise processing returns to 1601.

At swapping step 1607, the module 206 swaps the level state tables 214 and 213 using the switch 212. At the next clearing step 1609, when the state tables 213 and 214 have been swapped, the synchronisation flags 1209 are cleared, and the method 1300 returns to step 1331, where processing for the next scanline can commence in each swath.

Figure 15:
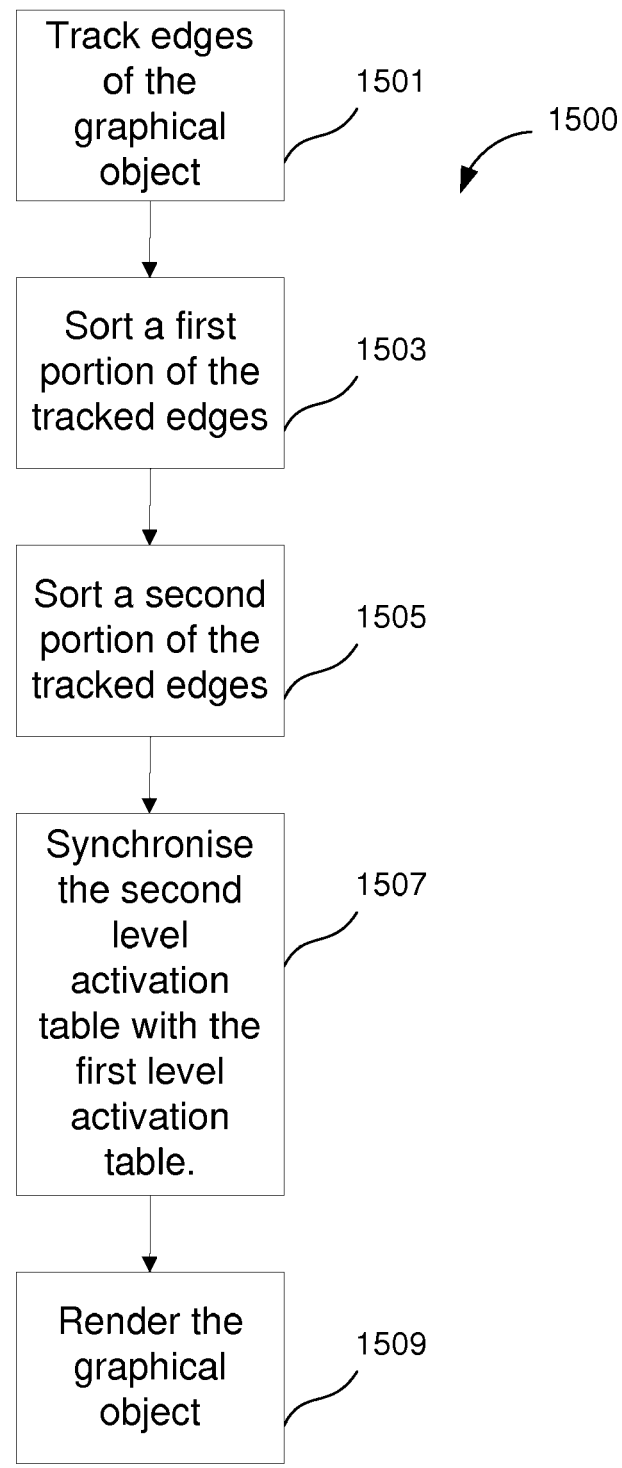
FIG. 15 is a flow diagram showing a method of rendering a graphical object on a page.

A method 1500 of rendering a graphical object on a page will now be described with reference to FIG. 15. The method 1500 may be implemented as one or more software code modules of the software application program 1433 resident on the hard disk drive 1410 and being controlled in its execution by the processor 1405.

The method 1500 begins at tracking step 1501, where the processor 1405 performs the step of tracking a plurality of edges of the graphical object. As described above, the edges of the graphical object are tracked using the edge tracking module 1102 under execution of the processor 1405. The tracker module 110 of the edge tracking module 1102 reads edge records (e.g., 30) from one of the set of edge buffers 101, 102 and 103 configured within the memory 1406. The edge records (e.g., 30) are tracked for one or more scanlines.

At first sorting step 1503, the processor 1405 performs the step of sorting a first portion of the tracked edges on a first portion of the page using a first sorter to control a first level activation table comprising level activation information. The level activation information of the first level activation table contains level state information, which determines which objects are visible on a page, and level fill information, which determines the colour of the visible objects. Then at second sorting step 1505, the processor performs the step of sorting a second portion of the tracked edges on a second portion of the page using a second sorter to control a second level activation table comprising further level activation information. The level activation information of the second level activation table also contains level state information and level fill information for a different swathe.

As described above, the position record 31 associated with each edge is transmitted through router 120 into one of a number of sorter modules 131, 132, according to the x-position of the edge on that scanline Each sorter module 131 and 132 maintains one or more buffers 141, 142 configured within the memory 1406. As also described above, the page to be printed is divided into swathes (or portions), and position records 31 for each swathe are maintained by the sorter module 131, 132 corresponding to the swathe. Position records 31 are read from the buffers 141 and 142 in order by a corresponding level state table controller module 151, 152 of the level activation module 1103 as shown in FIG. 1. The level state table controller modules 151, 152, under execution of the processor 1405, output a list of visible levels that is transmitted in compositing order to level activation modules (LA1) 180, (LA2) 182. The level activation modules 180, 182 share access to a level fill table (LFT) 181. The level fill table 181 stores graphics commands that correspond to each object.

The method 1500 continues at synchronising step 1507, where the processor 1405 performs the step of synchronising the level activation information in the second level activation table with the level activation information in the first level activation table. As described above, synchronisation is necessary since the state of the level state tables (e.g., 214, 213) at the start of each swath is determined before processing can proceed. A method 1600 of synchronising the level activation information in the second level activation table with the level activation information in the first level activation table, as executed at step 1505, will be further described below with reference to FIG. 16.

The method 1500 concludes at rendering step 1509, where the processor 1405 performs the step of rendering the graphical object on the page using the level activation information in the first level activation table and the synchronised level activation information in the second level activation table. As described above, the level state table controller module 151 checks the X_current value stored in field 314 of the position record 31 against the LST_current_X value stored in the register 903. If the X_current value and the LST_current_X value are different, paint message generator 907 is signalled and the graphical objects that are visible are determined and read out of state table 900 configured within memory 1406. The visible graphical objects are passed via router 170 to current level activation module 180, 182. The current level activation module 180, 182 generates paint commands to render the graphical objects between the LST_current_X value and the X_current value.

The method 1600 of synchronising the level activation information in the second level state table with the level activation information in the first level state table, as executed at step 1505, will now be described with reference to FIG. 16. The method 1600 may be implemented as one or more software code modules of the software application program 1433 resident on the hard disk drive 1410 and being controlled in its execution by the processor 1405. The method 1600 will described with reference to the example of FIG. 6A.

The method 1600 begins at first level state table step 1601, where the processor 1405 performs the step of obtaining the level activation information in the first level state table of a first scanline in the first portion (or swathe) of the page. Then at second level state table step 1603, the processor 1405 performs the step of obtaining the second level activation information in the second level activation table of a second scanline in the second portion (or swath) of the page, where the second scanline follows the first scanline The method 1600 continues at end state determining step 1605, where the processor 1405 performs the step of determining a first end state of the level activation information of the first level state table and a second end state of the level activation information of the second level state table.

As described above with reference to FIG. 6A, position record 31 processing proceeds such that alternate scanlines are handled by the two state table controller modules 151, 152 of the level activation module 1103. When processing of scanline A reaches the end 601 of the scanline A, the processor 1405 waits for processing of scanline B to proceed to the end 602 of swath 1 (i.e., as shown by the phantom line at Max Swath X 1). Processing then moves to scanline A' as shown by reference numeral 603. Paint commands for rendering scanline A' may be sent to the level activation modules 180 or 181 for swath 1. Similarly, processing of scanline B waits until all paint commands for scanline A have been sent to the level activation modules 180 or 181 for swath 2 before proceeding beyond point 602.

The method 1600 continues at swapping step 1607, where the processor 1405 performs the step of swapping the level activation information of the first level activation table and the level activation information of the second level activation table based on the determined first end state and the second end state. Finally, the method 1600 concludes at step 1609, signalling the state controller modules 151, 152 that processing may continue.

As further described above with reference to FIG. 6A, a routing switch is made by the synchroniser 160 after the SE flags 909 have been asserted for both level state table controller modules 151, 152. The routing switch is made, then the synchroniser 160 de-asserts the SE flags 909 in both level state table controller modules 151, 152. Thus, paint commands generated for scanline B beyond point 602 are directed to the level activation modules 180 or 182 for swath 2 after the paint commands for scanline A prior to point 601. The paint commands for scanline A' are passed to the level activation modules 180 or 181 for swath 1 after all of the paint commands for scanline B prior to the point 602.

INDUSTRIAL APPLICABILITY

The arrangements described are applicable to the computer and data processing industries and particularly for rendering.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of rendering graphical objects on a page using a pixel sequential renderer, the page being divided into at least a first swathe and a second swathe, said method comprising:
    tracking a plurality of edges of said graphical objects, a first portion of the tracked edges being associated with the first swathe and a second portion of the tracked edges being associated with the second swathe;
    determining a first plurality of said graphical objects associated with the first swathe using a first sorter for sorting the first portion of tracked edges;
    determining a second plurality of said graphical objects associated with the second swathe using a second sorter for sorting the second portion of tracked edges, the first plurality of graphical objects and the second plurality of graphical objects being determined in parallel, each graphical object being associated with a visibility state derived by the pixel sequential renderer based on tracked edges preceding said graphical object in a raster scan direction;
    determining first end visibility states of graphical objects on a first scanline at the end of the first swathe and second end visibility states of graphical objects on a preceding scanline at the end of the second swathe;
    synchronising visibility states of graphical objects associated with the first and the second swathes, in response to determining the first end visibility states and the second end visibility states, by providing visibility states of the first plurality of objects to a processing module associated with the second swathe to determine initial visibility states of graphical objects at the start of the second swathe on the first scanline; and
    rendering visible graphical objects on the page in the pixel sequential renderer, the visible graphical objects being determined using the synchronised visibility states.

2. A method according to claim 1, further comprising swapping the first plurality of graphical objects and the second plurality of graphical objects based on the determined first end visibility states and the second end visibility states.

3. A system for rendering graphical objects on a page using a pixel sequential renderer, the page being divided into at least a first swathe and a second swathe, said system comprising:
    a memory for storing data and a computer program;
    a processor coupled to said memory for executing said computer program, said computer program comprising instructions for:
        tracking a plurality of edges of said graphical objects, a first portion of the tracked edges being associated with the first swathe and a second portion of the tracked edges being associated with the second swathe;
        determining a first plurality of said graphical objects associated with the first swathe using a first sorter for sorting the first portion of tracked edges;
        determining a second plurality of said graphical objects associated with the second swathe using a second sorter for sorting the second portion of tracked edges, the first plurality of graphical objects and the second plurality of graphical objects being determined in parallel, each graphical object being associated with a visibility state derived by the pixel sequential renderer based on tracked edges preceding said graphical object in a raster scan direction;
        determining first end visibility states of graphical objects on a first scanline at the end of the first swathe and second end visibility states of graphical objects on a preceding scanline at the end of the second swathe;

synchronising visibility states of graphical objects associated with the first and the second swathes, in response to determining the first end visibility states and the second end visibility states, by providing visibility states of the first plurality of objects to a processing module associated with the second swathe to determine initial visibility states of graphical objects at the start of the second swathe on the first scanline; and rendering visible graphical objects on the page in the pixel sequential renderer, the visible graphical objects being determined using the synchronised visibility states.

4. An apparatus for rendering graphical objects on a page using a pixel sequential renderer, the page being divided into at least a first swathe and a second swathe, said apparatus comprising:

means for tracking a plurality of edges of said graphical objects, a first portion of the tracked edges being associated with the first swathe and a second portion of the tracked edges being associated with the second swathe;

means for determining a first plurality of said graphical objects associated with the first swathe using a first sorter for sorting the first portion of tracked edges;

means for determining a second plurality of said graphical objects associated with the second swathe using a second sorter for sorting the second portion of tracked edges, the first plurality of graphical objects and the second plurality of graphical objects being determined in parallel, each graphical object being associated with a visibility state derived by the pixel sequential renderer based on tracked edges preceding said graphical object in a raster scan direction;

means for determining first end visibility states of graphical objects on a first scanline at the end of the first swathe and second end visibility states of graphical objects on a preceding scanline at the end of the second swathe;

means for synchronising visibility states of graphical objects associated with the first and the second swathes, in response to determining the first end visibility states and the second end visibility states, by providing visibility states of the first plurality of objects to a processing module associated with the second swathe to determine initial visibility states of graphical objects at the start of the second swathe on the first scanline; and means for rendering visible graphical objects on the page in the pixel sequential renderer, the visible graphical objects being determined using the synchronised visibility states.

5. A non-transitory computer readable medium having recorded thereon a computer program for rendering graphical objects on a page using a pixel sequential renderer, the page being divided into at least a first swathe and a second swathe, said computer program comprising:

code for tracking a plurality of edges of said objects, a first portion of the tracked edges being associated with the first swathe and a second portion of the tracked edges being associated with the second swathe;

code for determining a first plurality of said graphical objects associated with the first swathe using a first sorter for sorting the first portion of tracked edges;

code for determining a second plurality of said graphical objects associated with the second swathe using a second sorter for sorting the second portion of tracked edges, the first plurality of graphical objects and the second plurality of graphical objects being determined in parallel, each graphical object being associated with a visibility state derived by the pixel sequential renderer based on tracked edges preceding said graphical object in a raster scan direction;

code for determining first end visibility states of graphical objects on a first scanline at the end of the first swathe and second end visibility states of graphical objects on a preceding scanline at the end of the second swathe;

code for synchronising visibility states of graphical objects associated with the first and the second swathes, in response to determining the first end visibility states and the second end visibility states, by providing visibility states of the first plurality of objects to a processing module associated with the second swathe to determine initial visibility states of graphical objects at the start of the second swathe on the first scanline; and code for rendering visible graphical objects on the page in the pixel sequential renderer, the visible graphical objects being determined using the synchronised visibility states.

6. The method according to claim 1, further comprising:

setting a first flag indicating that the first plurality of graphical objects is ready for synchronising, in response to completing processing of the first swathe, the first flag describing the first end visibility states; and setting a second flag indicating that the second plurality of graphical objects is ready for synchronising, in response to completing processing of the second swathe, the second flag describing the second end visibility state.

7. The method according to claim 6, wherein the predetermined condition for synchronisation is satisfied if the first and the second flags are set.

8. The method according to claim 1, wherein the first plurality of graphical objects is determined by a first activation module, the first activation module being assigned to the first swathe and being coupled to a first activation buffer for storing the first plurality of graphical objects; and the second plurality of graphical objects is determined by a second activation module in parallel with determining the first plurality of graphical objects, the second activation module being assigned to the second swathe and is coupled to a second activation buffer for storing the second plurality of graphical objects, wherein the second activation module is configured to operate in parallel with the first activation module.

9. The method according to claim 8, further comprising coupling the first activation module with the second activation buffer and the second activation module with the first activation buffer.

10. The method according to claim 6, wherein synchronising further comprises checking the first and the second flags.

11. The method according to claim 8, further comprising waiting for at least one of the first activation module and the second activation module to satisfy the predetermined condition.

12. The method according to claim 1, further comprising routing the tracked edges to be processed by one of a first activation module and a second activation module based on positions of the tracked edges relative to the first and the second swathes, to identify the first and second portions of the tracked edges.

13. The method according to claim 1, further comprising simultaneously generating paint commands for the first and second swathes using the first plurality of graphical objects and the second plurality of graphical objects.

14. The method according to claim 1, wherein the second plurality of graphical objects is synchronised with the first plurality of graphical objects, in the event that active graphical objects are determined at the end of the first swathe and active graphical objects are determined at the end of the second swathe.

15. A method of rendering graphical objects on a page using a pixel sequential renderer, the page being divided into at least a first swathe and a second swathe, said method comprising:

tracking a plurality of edges of said graphical objects, a first portion of the tracked edges being associated with a first swathe and a second portion of the tracked edges being associated with a second swathe, the second swathe following the first swathe in a raster scan direction;

determining first swathe visibility states of graphical objects on the first swathe and second swathe visibility states of graphical objects on the second swathe using corresponding level visibility data associated with the first portion of the tracked edges and the second portion of the tracked edges respectively, the first swathe visibility states and the second swathe visibility states being determined in parallel by separate level state modules operating on alternate scanlines;

determining first end visibility states of graphical objects on a first scanline at the end of the first swathe and second end visibility states of graphical objects on a preceding scanline at the end of the second swathe;

synchronising the first swathe visibility states and the second swathe visibility states, in response to determining the first end visibility states and the second end visibility states, by providing an access to the level state module associated with the second swathe to the first end visibility states to determine initial visibility states of graphical objects at the start of the second swathe on the first scanline; and rendering visible graphical objects on the page in the pixel sequential renderer, wherein the visible objects are determined using the synchronised visibility states.

16. A method of rendering graphical objects on a page using a pixel sequential renderer, the page being divided into at least a first swathe and a second swathe, said method comprising:

tracking a plurality of edges of said graphical objects, a first portion of the tracked edges being associated with a first swathe and a second portion of the tracked edges being associated with a second swathe;

determining a first plurality of said graphical objects associated with the first swathe using the first portion of tracked edges;

determining a second plurality of said graphical objects associated with the second swathe using the second portion of tracked edges, the first plurality of graphical objects and the second plurality of graphical objects being determined in parallel, each graphical object being associated with a visibility state derived by the pixel sequential renderer based on tracked edges preceding said graphical object in a raster scan direction;

synchronising visibility states of graphical objects associated with the first and the second swathes, in response to determining end visibility states of graphical objects at the boundary of each of the swathes, by providing visibility states of the first plurality of objects to a processing module associated with the second swathe to determine initial visibility states of graphical objects at the start of the second swathe on a following scanline; and rendering visible graphical objects on the page in the pixel sequential renderer, wherein the visible graphical objects are determined using the synchronised visibility states.

* * * * *